(12) United States Patent
Nishio

(10) Patent No.: US 6,639,696 B1
(45) Date of Patent: Oct. 28, 2003

(54) IMAGE READING APPARATUS

(75) Inventor: Tomonori Nishio, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/329,222

(22) Filed: Jun. 10, 1999

(30) Foreign Application Priority Data

Jun. 11, 1998 (JP) ........................................... 10-163819

(51) Int. Cl.$^7$ ................................................ H04N 1/04
(52) U.S. Cl. ........................ 358/487; 358/475; 358/506; 358/509
(58) Field of Search ............................... 358/506, 509, 358/514, 513, 475, 487; 348/96, 97; 355/56, 57

(56) References Cited

U.S. PATENT DOCUMENTS 5,038,168 A * 8/1991 Kurimoto et al. ............. 355/56
5,652,618 A * 7/1997 Nanba ......................... 348/96

* cited by examiner

Primary Examiner—Cheukfan Lee
(74) Attorney, Agent, or Firm—Sughrue Mion, PLLC

(57) ABSTRACT

An image reading apparatus, according to the present invention, capable of obtaining high quality image data in accordance with reading determining conditions is provided.

The reading determining conditions for an image are as follows. The first step is waiting for the input of resolution (S200) and then pre-scanning of a photographic film to be read is carried out (S202–206). After that, as setup for the fine scanning, a zoom magnification corresponding to the resolution inputted in S200 and the lens diaphragm condition are determined and then, respective sections are set to that zoom magnification and lens diaphragm condition (S208, 210). Then, fine-scan is carried out for all film images (S212–220).

27 Claims, 11 Drawing Sheets

IMAGE READING APPARATUS

BACKGROUND OF THE INVENTION

1. Field of the Invention

The present invention relates to an image reading apparatus and more specifically to an image reading apparatus for optically reading an image recorded on an original which is to be read such as a photographic film.

2. Description of the Related Art

According to photographic processing methods proposed recently, a film image recorded on a photographic film is separated into components of red, green and blue and is read. The image data obtained from the reading is subjected to various types of corrections and recorded on a recording material or displayed on a display unit. Note that the term photographic film used here refers to a film whose negative image or positive image is visualized by development after a photograph has been taken of an object.

Technology for realizing an image reading apparatus for use in reading the film image in this type of photographic processing method has been proposed in, for example, Japanese Patent Application Laid-Open No. 6-233052, in which is disclosed a plurality of photoelectric conversion elements having different photometric amount limits (saturation light amount) are used as image sensors and depending on the amount of light carrying image information, the photoelectric conversion devices are selected, there by making it possible to read an image over a wide dynamic range.

However, because the technology described in the aforementioned JP-A No. 6-233052 is not provided with means for adjusting the width of the luminous flux passing through image-forming lens for forming an image on a photoelectric conversion element, it is not capable of reading an image with an optimum luminous flux width corresponding to the reading determining conditions (the conditions for determining the reading conditions) and it is not possible to always obtain high quality image data from all types of reading determining conditions.

Namely, although if a high resolution reading is required, the focusing magnification of the focusing lens needs to be increased to obtain image data composed of many pixels, in this case, the depth of field becomes shallow so that the picture quality deteriorates. Although the width of luminous flux passing the focusing lens is required to be smaller to respond to this phenomenon, because the technology described in the above JP-A No. 6-233052 has no means for adjusting this luminous flux width, high quality image data cannot be obtained.

SUMMARY OF THE INVENTION

Accordingly, the present invention has been achieved to solve the above problems, and therefore, it is an object of the invention to provide an image reading apparatus capable of obtaining high quality image data in accordance with reading determining conditions.

To achieve the above object, according to a first aspect of the present invention, there is provided an image reading apparatus comprising: a light source for illuminating an original object to be read; focusing means provided with a diaphragm capable of altering the width of the luminous flux of a light beam projected through the diaphragm, and for focusing an image recorded on said original document to be read; an image sensor for separating said image recorded on said original document to be read, reading said image, and outputting said image as image data when a light which has passed through said focusing means is projected onto said image sensor; and control means for controlling the state of said diaphragm for adjusting the width of said luminous flux in accordance with the reading determining conditions of the original object to be read.

In the image reading apparatus of the first aspect of the invention, an original object to be read is illuminated by a light source and an image recorded on the original object to be read is focused by a focusing means having a diaphragm capable of changing the luminous flux width of a projected beam. Then, an image recorded on the original object to be read is separated into a plurality of pixels and read, so that it is output in the form of image data. The above original object to be read includes transparent originals and reflective originals. The above image sensor includes a line CCD and area CCD.

In the image reading apparatus of the first aspect of the present invention, the state of the diaphragm provided on the focusing means is controlled by the control means so as to adjust the luminous flux width of light projected into the focusing means in accordance with the reading determining conditions of the original object to be read.

As described above, in the image reading apparatus of the first aspect of the present invention, the focusing means contains a diaphragm capable of changing the luminous flux width of the projected light and the condition of the diaphragm is controlled so that the luminous flux width is adjusted in accordance with the reading determining conditions of the original object to be read. Therefore, the luminous flux width of light passing through the focusing means can be controlled to the optimum width in accordance with the reading determining conditions, so that high quality image data can be obtained.

According to a second aspect of the present invention, there is provided an image reading apparatus according to claim 1, wherein one of said reading determining conditions is a focusing magnification of said focusing means and said control means controls the state of said diaphragm so that the higher said focusing magnification, the smaller the width of said luminous flux.

In the image reading apparatus of the second aspect of the present invention, one of the reading determining conditions according to the first aspect is a focusing magnification of the focusing means and the condition of the diaphragm is controlled by the control means so that the higher the focusing magnification, the smaller the luminous flux width.

That is, generally the higher the focusing magnification of the focusing means, the shallower the depth of field, so that the picture quality deteriorates. To suppress the deterioration of the picture quality, the luminous flux width of light passing through the focusing means is controlled so as to become smaller as the focusing magnification increases.

As described above, in the image reading apparatus of the second aspect of the present invention, one of the reading determining conditions according to the first aspect is a focusing magnification and further, the condition of the diaphragm is controlled so that the higher the focusing magnification, the smaller the luminous flux width. Therefore, the optimum luminous flux width can be set in accordance with the focusing magnification so that high quality image data can be obtained.

According to a third aspect of the present invention, there is provided an image reading apparatus according to claim 1, wherein one of said reading determining conditions is the effective F number on said original object to be read and said control means controls the state of said diaphragm so that said effective F number is constant.

In the image reading apparatus of the third aspect of the present invention, one of the reading determining conditions according to the first aspect is the effective F number of the original object to be read and the condition of the diaphragm is controlled by the control means so that the effective F number is constant.

The effective F number of the original object to be read is proportional to the F number indicating the brightness of the optical system (the brighter, the smaller) and proportional to an inverse number of the focusing magnification. Therefore, to make such a effective F number constant, the F number is increased as the focusing magnification is increased. To increase the F number, the optical system needs to be darkened. Therefore, to make the effective F number constant, the diaphragm is controlled so that the luminous flux width of light passing through the focusing means is reduced as the focusing magnification is increased.

As described above, in the image reading apparatus of the third aspect of the present invention, one of the reading determining conditions according to the first aspect is the effective F number of the original object to be read and the condition of the diaphragm is controlled so that the effective F number is constant. Therefore, the optimum luminous flux width in accordance with the focusing magnification of the focusing means can be set so that high quality image data can be obtained.

According to a fourth aspect of the present invention, there is provided an image reading apparatus according to claim 1, wherein one of said reading determining conditions is the density of said original object to be read and said control means controls the state of said diaphragm so that the higher said density, the larger the width of said luminous flux.

In the image reading apparatus of the fourth aspect of the present invention, one of the reading determining conditions according to the first aspect is the density of the original object to be read and the condition of the diaphragm is controlled so that the higher the density, the larger the luminous flux width.

Namely, because the amount of light passing through the original object to be read or reflected from the original object to be read is decreased as the density of the original object to be read is increased, in this case, by increasing the luminous flux width of light passing through the focusing means, a reduction of light amount due to the density of the original object to be read is compensated.

As described, in the image reading apparatus of the fourth aspect of the present invention, because one of the reading determining conditions according to the first aspect is the density of the original object to be read and the condition of the diaphragm is controlled so that the higher the density, the larger the luminous flux width, the optimum luminous flux width in accordance with the density of the original object to be read can be set so that high quality image data can be obtained.

According to the image reading apparatus of a fifth aspect of the present invention, there is provided an image reading apparatus according to claim 1, wherein one of said reading determining conditions is the reading speed for said original object to be read and said control means controls the state of said diaphragm so that the faster said reading speed, the larger the width of said luminous flux.

In the image reading apparatus of the fifth aspect of the present invention, one of the reading determining conditions according to the first aspect is the reading speed for the original object to be read and the condition of the diaphragm is controlled so that the faster the reading speed, the larger the luminous flux width.

Namely, because the faster the reading speed for the original object to be read becomes, the shorter the reading time by the image sensor becomes, and in the case where the image sensor is, for example, a CCD sensor, the electric charge accumulation time per unit time is shortened, by enlarging the luminous flux width of light passing through the focusing means, a drop in the reading sensitivity of the image sensor accompanied by a reduction of the electric charge accumulating time caused by the increased reading speed for the original object to be read is compensated.

As described above, in the image reading apparatus of the fifth aspect of the present invention, because one of the reading determining conditions according to the first aspect is reading speed for the original object to be read and the diaphragm is controlled so that the faster the reading speed, the larger the luminous flux width, an optimum luminous flux width in accordance with the reading speed for the original object to be read can be set, so that high quality image data can be obtained.

According to a sixth aspect of the present invention, there is provided an image reading apparatus according to claim 1, wherein one of said reading determining conditions is the amount of unevenness on the surface of said original object to be read and said control means controls the state of said diaphragm so that the larger the amount of said unevenness, the smaller the width of said luminous flux.

In the image reading apparatus of the sixth aspect of the present invention, one of the reading determining conditions according to the first aspect is the amount of unevenness of the surface of the original object to be read and the condition of the diaphragm is controlled by the control means so that the larger the amount of unevenness, the smaller the luminous flux width.

That is, because the larger the amount of unevenness of the surface of the original object to be read becomes, the more the picture quality deteriorates, by reducing the luminous flux width of light passing through the focusing means, the deterioration of the picture quality due to the amount of unevenness of the surface of the original object to be read is suppressed.

As described above, in the image reading apparatus of the sixth aspect of the present invention, because one of the reading determining conditions according to the first aspect is the amount of unevenness of the surface of the original object to be read and the condition of the diaphragm is controlled so that the larger the amount of unevenness becomes, the smaller the luminous flux width becomes, an optimum luminous flux width in accordance with the amount of unevenness of the original object to be read can be set, so that high quality image data can be obtained.

According to a seventh aspect of the present invention, there is provided an image reading apparatus according to claim 1, wherein one of said reading determining conditions is the degree of diffusion of said original object to be read and said control means controls the state of said diaphragm so that the larger said degree of diffusion, the larger the width of said luminous flux.

In the image reading apparatus of the seventh aspect of the present invention, one of the reading determining conditions according to the first aspect is the degree of diffusion of the original object to be read and the condition of the diaphragm is controlled by the control means so that the larger the degree of diffusion, the larger the luminous flux width.

Namely, when the original object to be read is a monochrome film, the ratio of silver existing therein is higher as compared to color film so that the degree of diffusion of the light passing through the focusing means is high and the degree of reduction of the light amount is high. Therefore, by increasing the luminous flux width of light passing through the focusing means, the reduction of the light amount caused by the degree of diffusion of the original object to be read is compensated.

As described above, in the image reading apparatus of the seventh aspect of the present invention, because one of the reading determining conditions according to the first aspect is the degree of diffusion of the original object to be read and the condition of the diaphragm is controlled so that the larger the degree of diffusion becomes, the larger the luminous flux width becomes, the optimum luminous flux width corresponding to the degree of diffusion of the original object to be read can be set, so that high quality image data can be obtained.

According to an eighth aspect of the present invention, there is provided an image reading apparatus according to claim 1, wherein one of said reading determining conditions is the reading size of said original object to be read and said control means control the state of said diaphragm so that the larger said reading size, the smaller the width of said luminous flux.

In the image reading apparatus of the eighth aspect of the present invention, one of the reading determining conditions according to the first aspect is the reading size of the original object to be read and the condition of the diaphragm is controlled by the control means so that the larger the reading size, the smaller the luminous flux width.

Namely, because the larger the reading size for the original object to be read becomes, the more the focusing means is affected by the vignetting, by reducing the luminous flux width of light passing through the focusing means, the influence of the vignetting caused by the extent of the reading size of the above original object to be read is suppressed.

As described above, in the image reading apparatus of the eighth aspect of the present invention, because one of the reading determining conditions according to the first aspect is the reading size of the original object to be read and the condition of the diaphragm is controlled so that the larger the reading width, the smaller the luminous flux width, the optimum luminous flux width in accordance with the reading size of the original object to be read can be set, so that high quality image data can be obtained.

It should be noted here that in order to increase the speed at which an image is read by an image reading apparatus, a preliminary reading of the image at comparatively high speed and low level of detail (referred to as a prescan in the present specification) is performed, and on the basis of the image data obtained from the prescan, the main reading of the image is performed at a comparatively low speed and at a high level of detail (referred to as a fine scan in the present specification) Each time a prescan and fine scan are performed, the reading conditions and the processing conditions for each type of image processing to be performed on the image data to be obtained from the fine scan are determined. The fine scan is performed under the determined reading conditions and image processing is performed in accordance with the above determined processing conditions on the image data obtained from the fine scan.

In this way, the speed at which the image is read in this type of image reading apparatus is faster during the prescan than during the fine scan.

According to the ninth aspect of the present invention, there is provided an image reading apparatus according to claim 1, wherein one of the reading determining conditions is the scanning state and the condition of the diaphragm is controlled so that the width of the luminous flux is greater for a prescan than for a fine scan.

In the image reading aspect of the ninth aspect of the invention, one of the reading determining conditions according to the first aspect is the scanning state and the condition of the diaphragm is controlled by the control means so that the width of the luminous flux is greater when the scanning state is a prescan scanning state than when the scanning state is a fine scan scanning state.

Namely, as is stated above, the speed at which the image is read during a prescan is faster than the speed at which the image is read during a fine scan. The faster the speed at which the image is read, however, the shorter the reading time by the image sensor, and when the image sensor is, for example, a CCD sensor, the shortening of the charge accumulation time per time unit is as described above.

Accordingly, by increasing the width of the luminous flux of light passing through focussing means, compensation can be made for the above time reduction in the charge accumulation time.

As described above, in the image reading apparatus of the ninth aspect of the invention, because one of the reading determining conditions according to the first aspect is the scanning state and the condition of the diaphragm is controlled so that the width of the luminous flux is greater when the scanning state is a prescan scanning state than when the scanning state is a fine scan scanning state, the optimum luminous flux width in accordance with the reading size of the original object to be read can be set, so that high quality image data can be obtained.

In the image reading apparatus of the tenth aspect of the present invention, one of the reading determining conditions according to the first aspect is the state in which the original object to be read is held, and the condition of the diaphragm is controlled by the control means so that when the original object to be read is held in a mounted state, the width of the luminous flux is reduced.

Namely, when the original object to be read is held in a mounted state, the greater the amount of variation in the width of the mounted member, the greater the deterioration in the image quality. Therefore, by reducing the width of the luminous flux of light passing through the focussing means, the depth of field can be increased which enables the deterioration in the image quality caused by variations in the thickness of the mounted member to be suppressed.

As described above, in the image reading apparatus of the tenth aspect of the present invention, because one of the reading determining conditions according to the first aspect is the state in which the original object to be read is held and the condition of the diaphragm is controlled so that the width of the luminous flux is reduced when the original object to be read is held in a mounted state, the optimum luminous flux width in accordance with the state in which the original object to be read is held can be set, so that high quality image data can be obtained.

According to an eleventh aspect of the present invention, there is provided an image reading apparatus according to claim 1, wherein reading determining conditions for reading said original object to be read include at least two of the focusing magnification, the effective F number, the density, the reading speed, the amount of unevenness, the degree of diffusion, the reading size, the scanning state, and the holding state of said original object to be read and said control means controls the state of said diaphragm according to said reading determining conditions.

In the image reading apparatus of the eleventh aspect of the present invention, the reading determining conditions according to the first aspect include at least two of the focusing magnification of the original object to be read, the effective F number of the original object to be read, the density, the reading speed, the amount of unevenness, the degree of diffusion, the reading size, the scanning state, and the holding state of the original object to be read and the condition of the diaphragm is controlled by the control means based on the above mentioned reading determining conditions.

As described above, in the image reading apparatus of the eleventh aspect of the present invention, because the reading conditions according to the first aspect include at least two of the focusing magnification, effective F number, density, reading speed, amount of unevenness, amount of diffusion, reading size, scanning state, and holding state of the original object to be read and the condition of the diaphragm is controlled based on the reading determining conditions, the optimum luminous flux width in accordance with at least two of the above reading determining conditions can be set, so that high quality image data can be obtained.

According to a twelfth aspect of the present invention, there is provided an image reading apparatus according to the first aspect further comprising a light amount control means capable of controlling the amount of light for illuminating said original object to be read.

In the image reading apparatus of the twelfth aspect of the present invention, because the first aspect is provided with a light amount control means capable of controlling the amount of light irradiated over the original object to be read, the optimum light amount and luminous flux width corresponding to the reading determining conditions can be set, so that high quality image data can be obtained.

DETAILED DESCRIPTION OF THE PREFERRED EMBODIMENTS

Hereinafter, the embodiment of the present invention will be described in detail with reference to the accompanying drawings.

First Embodiment

Figure 1:
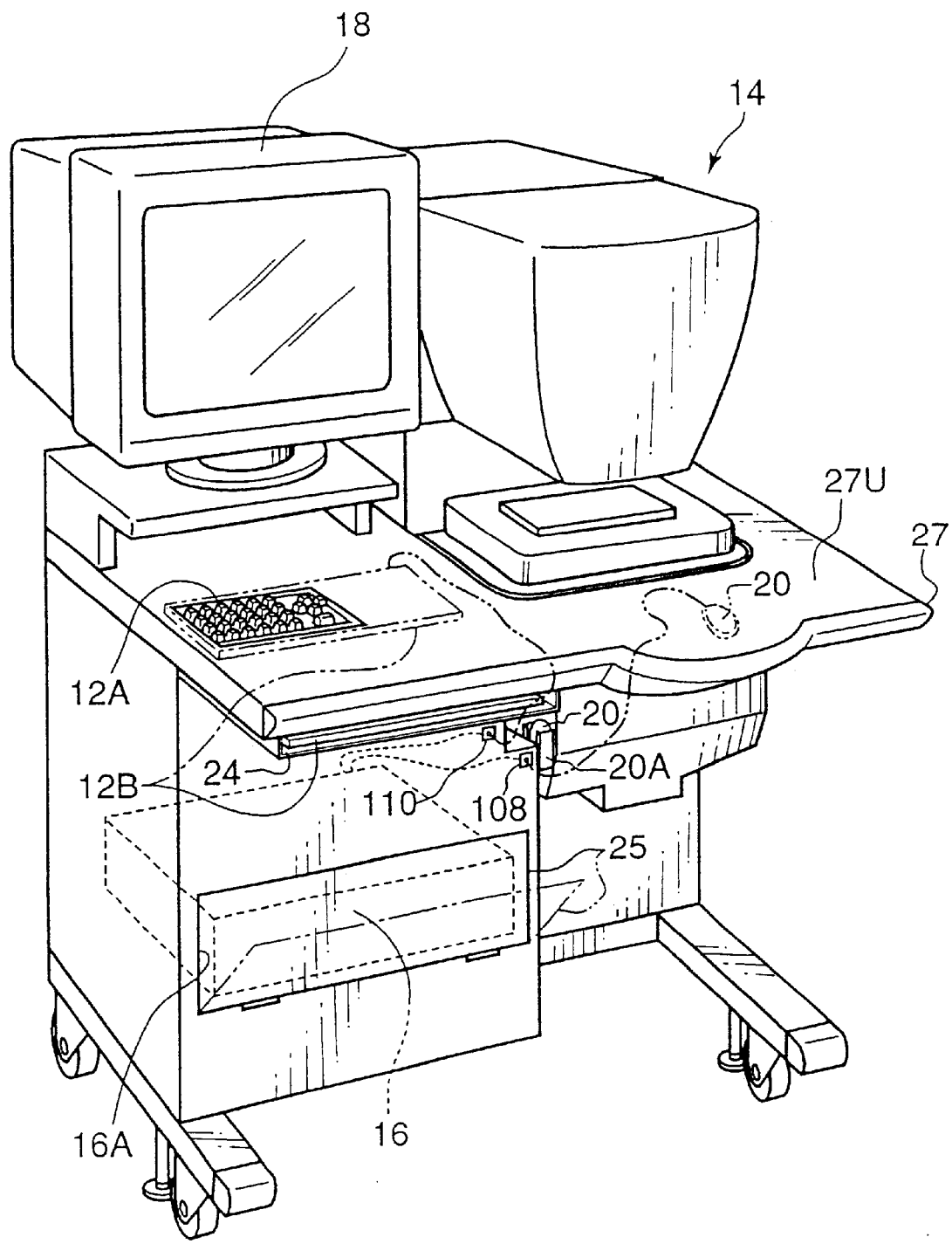
FIG. 1 is a schematic view of an image reading apparatus according to the embodiment of the present invention.

As shown in FIG. 1, an image reading apparatus of the present embodiment includes a line CCD scanner 14. The line CCD scanner 14 comprises an image processing section 16, a mouse 20, two types of keyboards 12A and 12B, and a display 18, which are provided on a working table 27.

One keyboard 12A is buried in the working surface 27U of the working table 27. The other key board 12B is accommodated in a drawer 24 of the working table 27 when it is not being used and when it is being used, it is brought out from the drawer 24 and laid on top of the keyboard 12A. At this time, a cord of the keyboard 12B is connected to a jack 110 of the image processing section 16.

A cord of the mouse 20 is connected to the image processing section 16 through a hole 108 provided on the working table 27. The mouse 20 is accommodated in a mouse holder 20A when not in use and when in use, it is brought out from the mouse holder 20A and placed on the working surface 27U.

The image processing section 16 is accommodated in an accommodating section 16A provided in the working table 27 and closed by a door 25. By opening this door 25, the image processing section 16 can be brought out.

The line CCD scanner 14 reads a film image recorded on photographic film such as negative or reversal film, for example, 135 size photographic films, 110 size photographic films, photographic film in which a transparent magnetic layer is formed (i.e. 240 size photographic films, known as APS films), and 120 size and 220 size (brownie size) photographic films. The line CCD scanner 14 reads a film image on the above object to be read by means of a line CCD and outputs the image data.

Image data outputted from the line CCD scanner 14 is inputted to the image processing section 16 and image processings such as various types of correction are carried out on the inputted image data and that processed data is outputted to a laser printer (not shown) a s recording image data.

Figure 2:
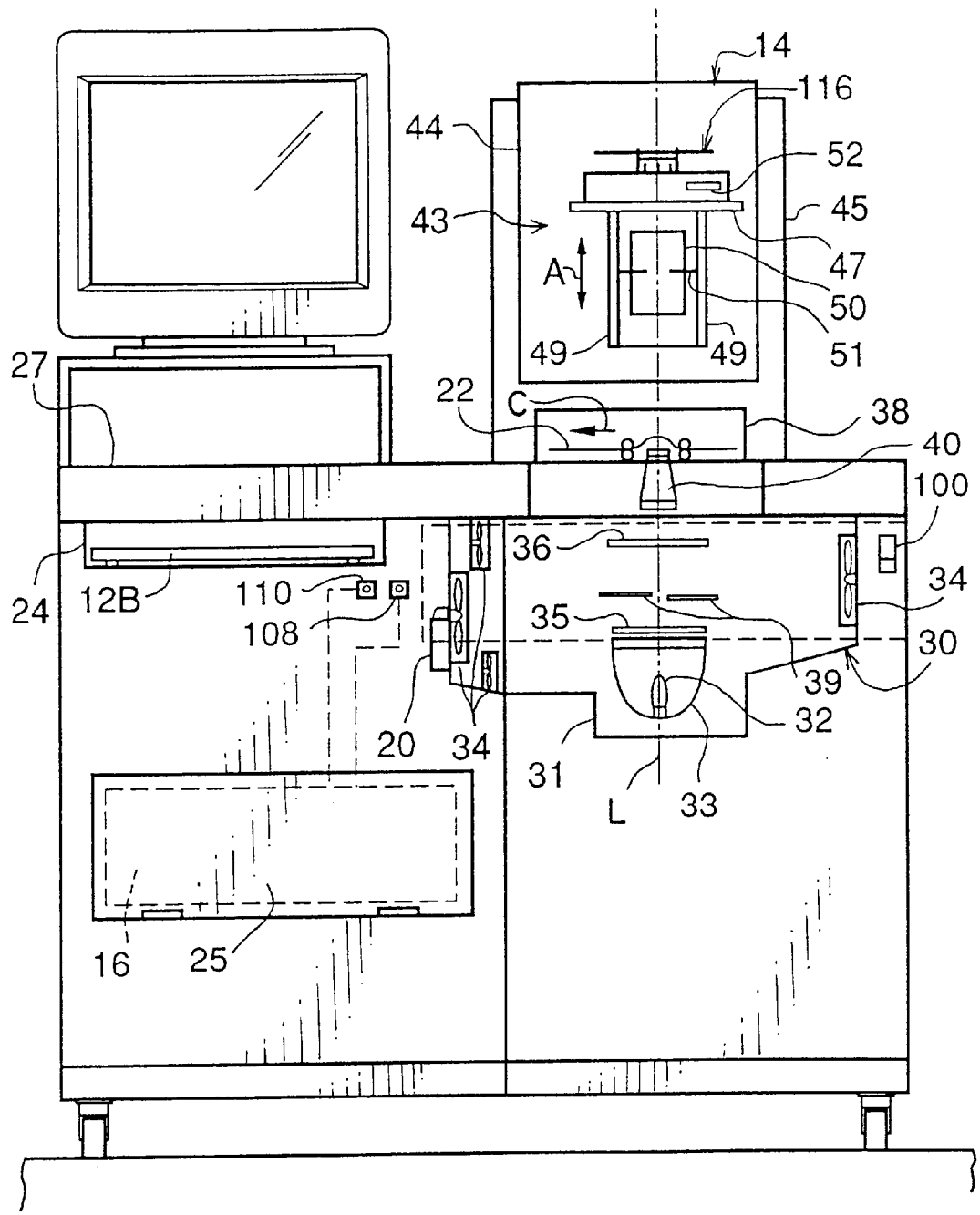
FIG. 2 is a front sectional view of an optical system of the image reading apparatus of this embodiment.
Figure 3:
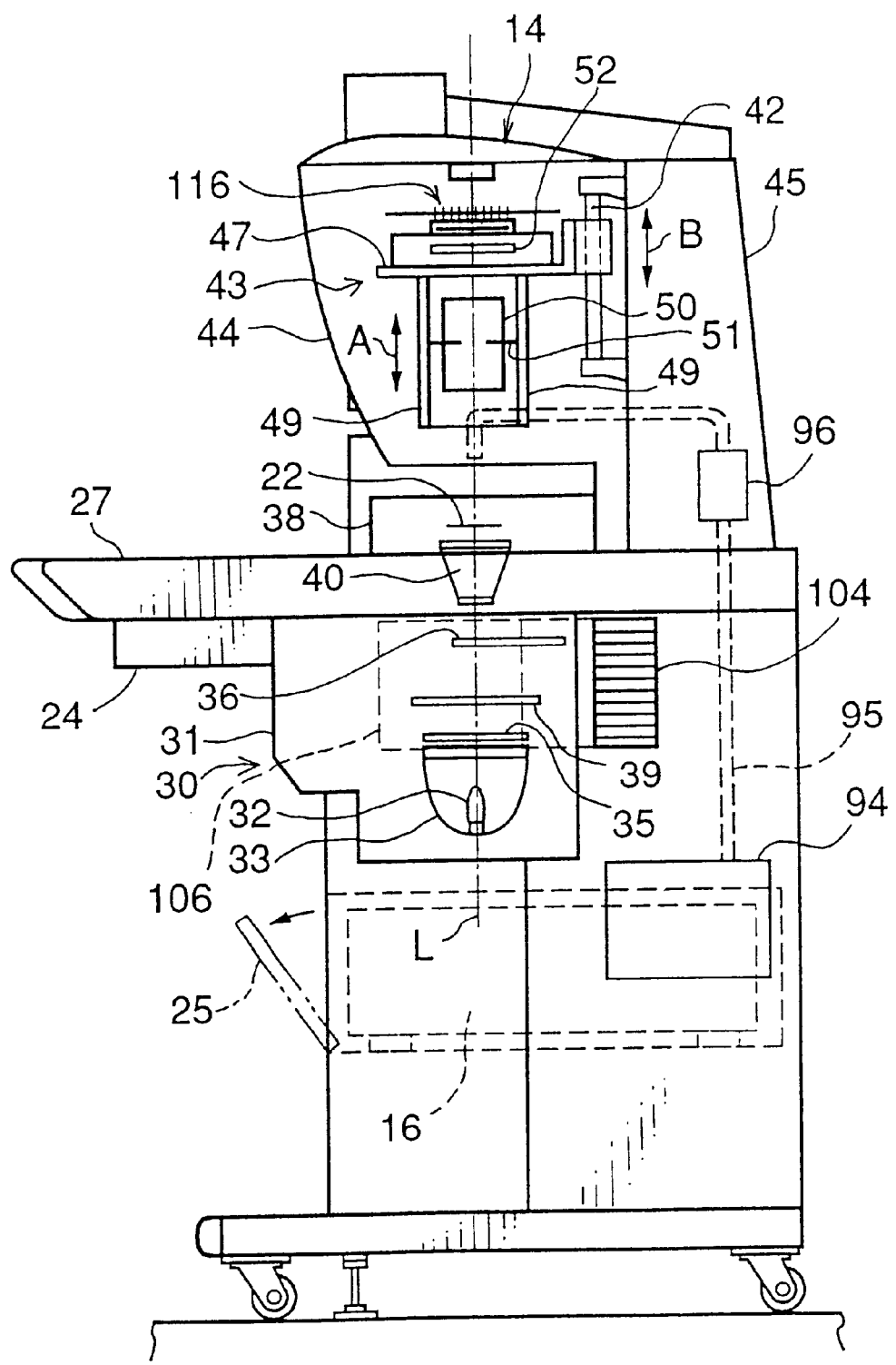
FIG. 3 is a side sectional view of the optical system of the image reading apparatus of this embodiment.

As shown in FIGS. 2 and 3, the optical system of the line CCD scanner 14 comprises a light source 30 disposed below the working table 27, a diffusion box 40 supported by the working table 27, a film carrier 38 set on the working table 27 and a reading section 43 disposed on the opposite side of the working table 27 to the light source 30.

The light source 30 is accommodated in a casing 31 made of metal and in the casing 31, a lamp 32 composed of a halogen lamp, metal halide lamp or the like is disposed.

A reflector 33 is disposed around the lamp 32 so that a part of light emitted from the lamp 32 is reflected by the reflector 33 and emitted in a predetermined direction. A plurality of fans 34 are provided to the sides of the reflector 33. The fans 34 are actuated while the lamp 32 is lit so as to prevent the interior of the casing 31 from being overheated.

On the light emission side of the reflector 33, are provided in sequence a UV/IR cut filter 35 for cutting light of ultraviolet and infrared region wavelength so as to prevent a rise in the temperature of the photographic film 22 thereby improving the reading accuracy, a diaphragm 39 for adjusting the amounts of light from the lamp 32 and the reflector 33, and a turret 36 (see FIG. 4B also) including a balance filter 36N for negative film and a balance filter 36F for reversal film for appropriately setting the color components of the light arriving at the photographic film 22 and the reading section 43 in accordance with the type of the photographic film (negative film/reversal film).

Figure 4A:
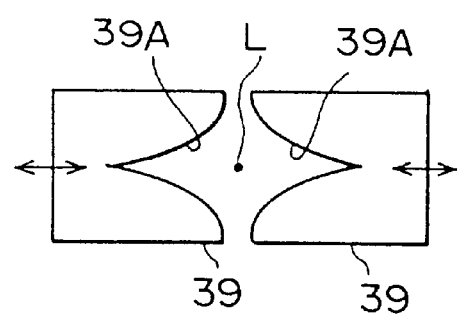
FIGS. 4A–4D are plan views showing a diaphragm, turret, lens diaphragm and CCD shutter respectively.

The diaphragm 39 is composed of a pair of plate materials disposed on either side of a light axis L and are constructed so as to be able to slide both towards and away from each other. As shown in FIG. 4A, a cutout section 39A is formed on each end section of the pair of plate materials of the diaphragm 39, so that a area of the across-section in a direction perpendicular to the sliding direction changes continuously from an end of the plate materials to the other along the sliding direction. The plate materials are disposed so that the sides in which the cutout sections 39A are formed, face each other.

In the above structure, any one of the filters (36N, 36P) depending on the type of the photographic film is positioned on the light axis L so as to obtain a desired color component and the light passing the diaphragm 39 is adjusted to a desired light amount depending on the position of the diaphragm 39.

The diffusion box is shaped so that the width thereof in the direction of transportation of the photographic film which is transported by the film carrier 38 decreases the closer to the top, namely the closer to the photographic film 22 (see FIG. 2), and the width thereof in the direction orthogonal to the direction of transportation of the photographic film 22 (namely, the widthwise direction of the photographic film 22) increases the closer to the top, namely the closer to the photographic film 22 (see FIG. 3). A light diffusion plate (not shown) is attached to both the incident light side and the light emission side of the diffusion box 40. Although the above-mentioned diffusion box 40 is intended for a 135 size photographic film, other diffusion boxes (not shown) corresponding to other photographic films are available.

Light entering into the diffusion box 40 is converted to a slit beam facing the film carrier 38 (i.e. toward the photographic film 22) in such a way that the longitudinal direction thereof is the widthwise direction of the photographic film 22. Further, this light is converted to diffused light by the light diffusion plate and emitted from the diffusion box. Because the light emitted from the diffusion box 40 is diffused, unevenness in the light amount irradiated onto the photographic film 22 is decreased so that a uniform amount of the slit light is irradiated onto a film image. For this reason, even if there is a flaw on the film image, this flaw becomes difficult to notice.

A film carrier 38 and diffusion box 40 are available for each type of photographic film 22 and are selected depending on the type of photographic film 22.

Long, narrow opening (no shown), whose length is longer than the width of the photographic film 22 in the widthwise direction of the photographic film, are provided in both the top and bottom surfaces of the film carrier 38 at a position thereof intersecting the light axis L. The slit beam from the diffusion box 40 is irradiated onto the photographic film 22 through the opening provided on the lower surface of the film carrier 38, and light passing through the photographic film 22 arrives at the reading section 43 through the opening provided on the upper surface of the film carrier 38.

The film carrier 38 has a guide (not shown) for guiding the photographic film 22 so that the photographic film 22 is curved at the position (reading position) where it is irradiated with the slit beam from the diffusion box 40. As a result, flatness of the photographic film 22 is assured at the reading position.

The diffusion box 40 is supported so that the upper surface thereof is close to the above reading position. Therefore, the lower surface of the film carrier 38 is provided with a cutout section so as to avoid interference between the film carrier 38 and the diffusion box 40 when the film carrier 38 is loaded in the apparatus.

The film carrier 38 is structured so as to be capable of transporting the photographic film 22 at a plurality of speeds during pre-scan or fine scan depending on the density or the like of the film image to be fine scanned.

The reading section 43 is accommodated in the casing 44. Within the casing 44, a mounting base 47 including a line CCD 116 mounted on a upper face thereof is provided and a plurality of supporting rails 49 are suspended from the mounting base 47. A lens unit 50 is supported by the supporting rails 49 in such a manner as to be able to slide in the direction A in which it approaches or moves away from the working table 27 in order to change the magnification for reduction or enlargement. A supporting frame 45 is placed on the working table 27. The mounting base 47 is supported by the guide rail 42 mounted on the supporting frame 45 in such a manner that it can slide in the direction B in which it approaches or moves away from the working table 27 so as to assure a conjugate length during the above magnification change or during auto focusing.

Figure 4C:
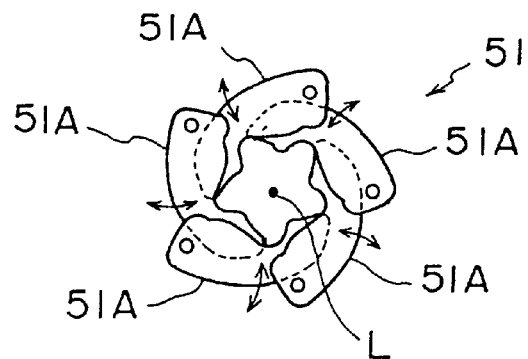
Figure 5:
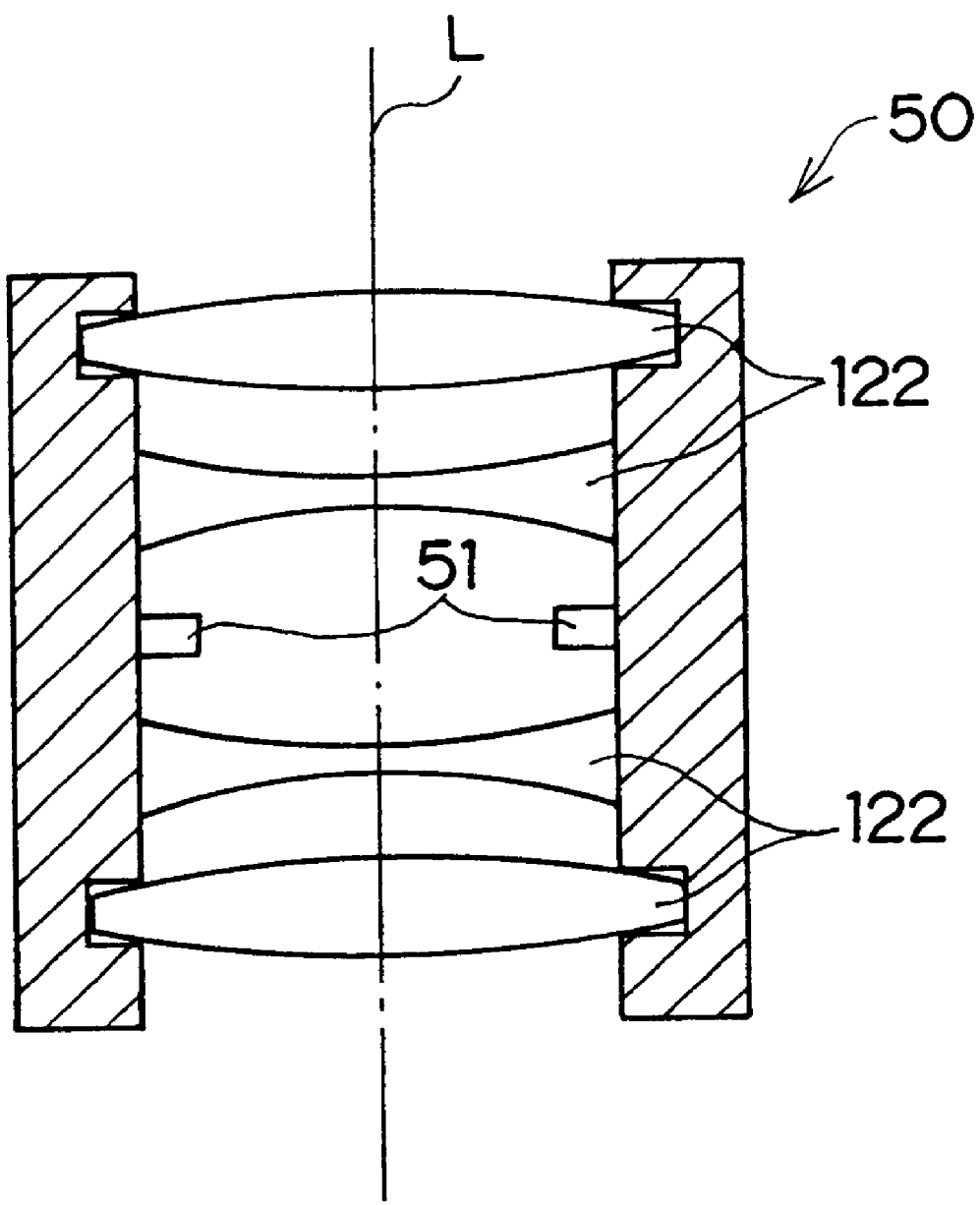
FIG. 5 is a side sectional view showing a structure of lens unit of the image reading apparatus of the embodiment.

As shown in FIG. 5, the lens unit 50 contains a plurality of lenses 122 and a lens diaphragm 51 is provided in the middle of the plurality of the lenses 122. As shown in FIG. 4C, the lens diaphragm 51 has a plurality of diaphragm plates 51A formed substantially in a C shape. The respective diaphragm plates 51A are disposed uniformly around the light axis L and an end section of each diaphragm plate 51A is pivotally supported by a pin so that it is rotatable around the pin. The plurality of diaphragm plates 51A are linked with each other through a link (not shown), so that if a driving force is transmitted from a lens diaphragm driving motor (described later), they are rotated in the same direction. Together with the rotation of this diaphragm plates 51A, the area of the region (the substantially star-shaped portion in FIG. 4C) not shaded by the diaphragm plates 51A around the light axis L changes so that the width of the luminous flux passing through the lens diaphragm 51 also changes.

In the line CCD 116, a plurality of photoelectric conversion elements such as CCD cells and photo diodes are disposed in a row in the widthwise direction of the photographic film 22 and three lines of sensing sections containing an electronic shutter mechanism are spaced apart from and parallel to each other. Color separation filters for red, green and blue are provided on the side of each sensing section irradiated by the incoming light (a so-called 3-line color CCD structure). A transmission section composed of plural CCD cells is provided in the vicinity of each sensing section corresponding to each sensing section and an electric charge accumulated in each CCD cell of each sensing section is transmitted in succession through a corresponding transmission section.

A CCD shutter 52 is provided on the side of the line CCD 116 irradiated by the incoming light. As shown in FIG. 4D, an ND filter 52ND is inserted in this CCD shutter 52. The CCD shutter 52 is rotated in the direction of the arrow u and is switched between one of a fully closed state (a section such as 52B where no ND filter 52ND is inserted is positioned at the position 52C which includes the light axis L) for shading light irradiated onto the line CCD 116 in order to perform darkness correction, a fully-open state (the position showing FIG. 4D) for allowing light to be irradiated onto the line CCD 116 in order to perform ordinary reading or brightness correction, and a reduced light state (the ND filter 52ND is positioned at the position 52C) for reducing light irradiated onto the line CCD 116 in order to perform linearity correction using of the ND filter 52ND.

As shown in FIG. 3, a compressor 94 for generating cooling air for cooling the photographic film 22 is disposed on the working table 27. The cooling air generated by a compressor 94 is introduced by a guide tube 95 to a reading section (not shown) of the film carrier 38 and supplied thereto. Consequently, a region located at the reading section for the photographic film 22 can be cooled. Note that the guide tube 95 passes through a flow rate sensor 96 for detecting the flow rate of the cooling air.

Figure 6:
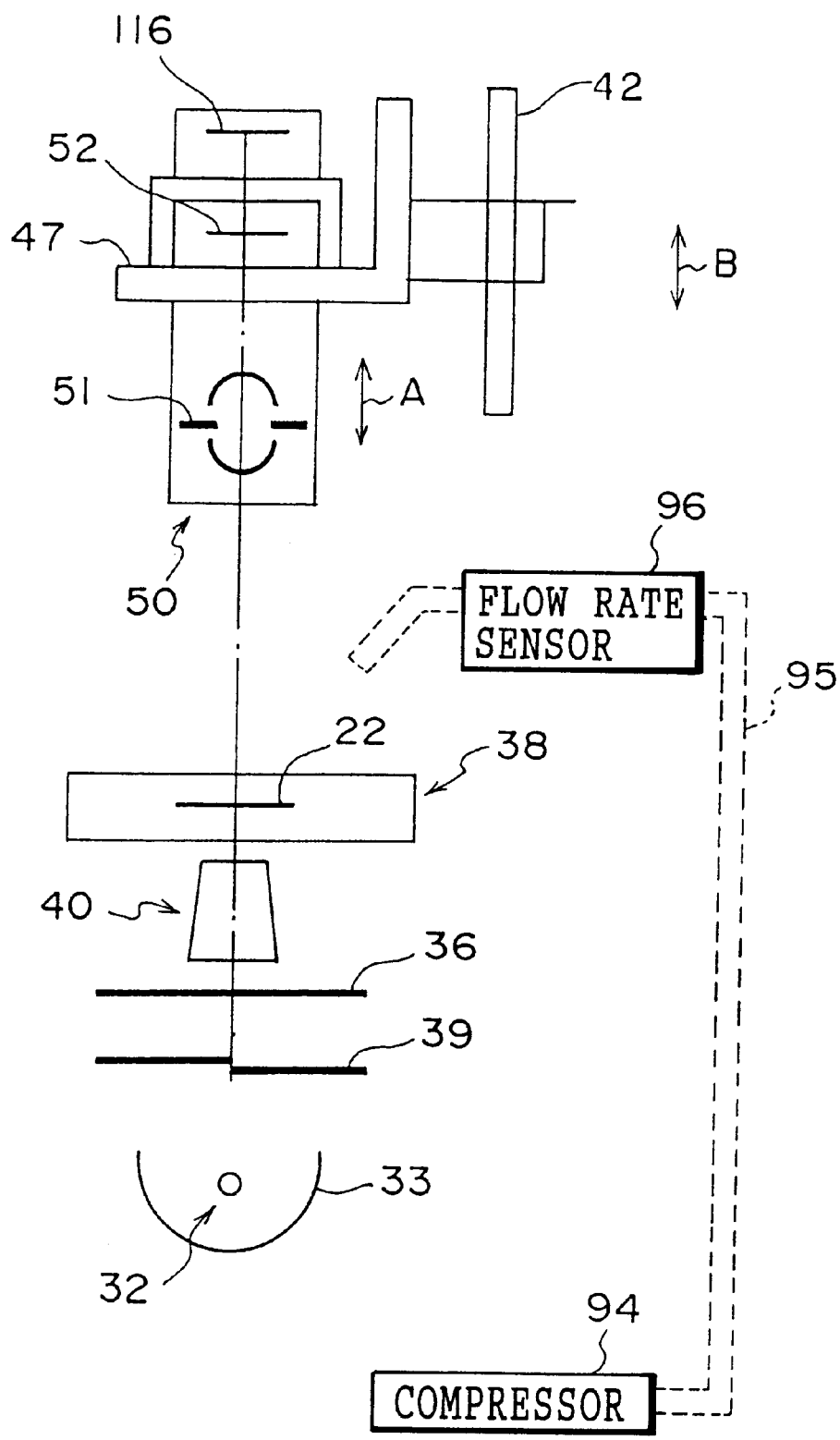
FIG. 6 is a schematic view showing only major parts of the optical system of the image reading apparatus of the embodiment.
Figure 7:
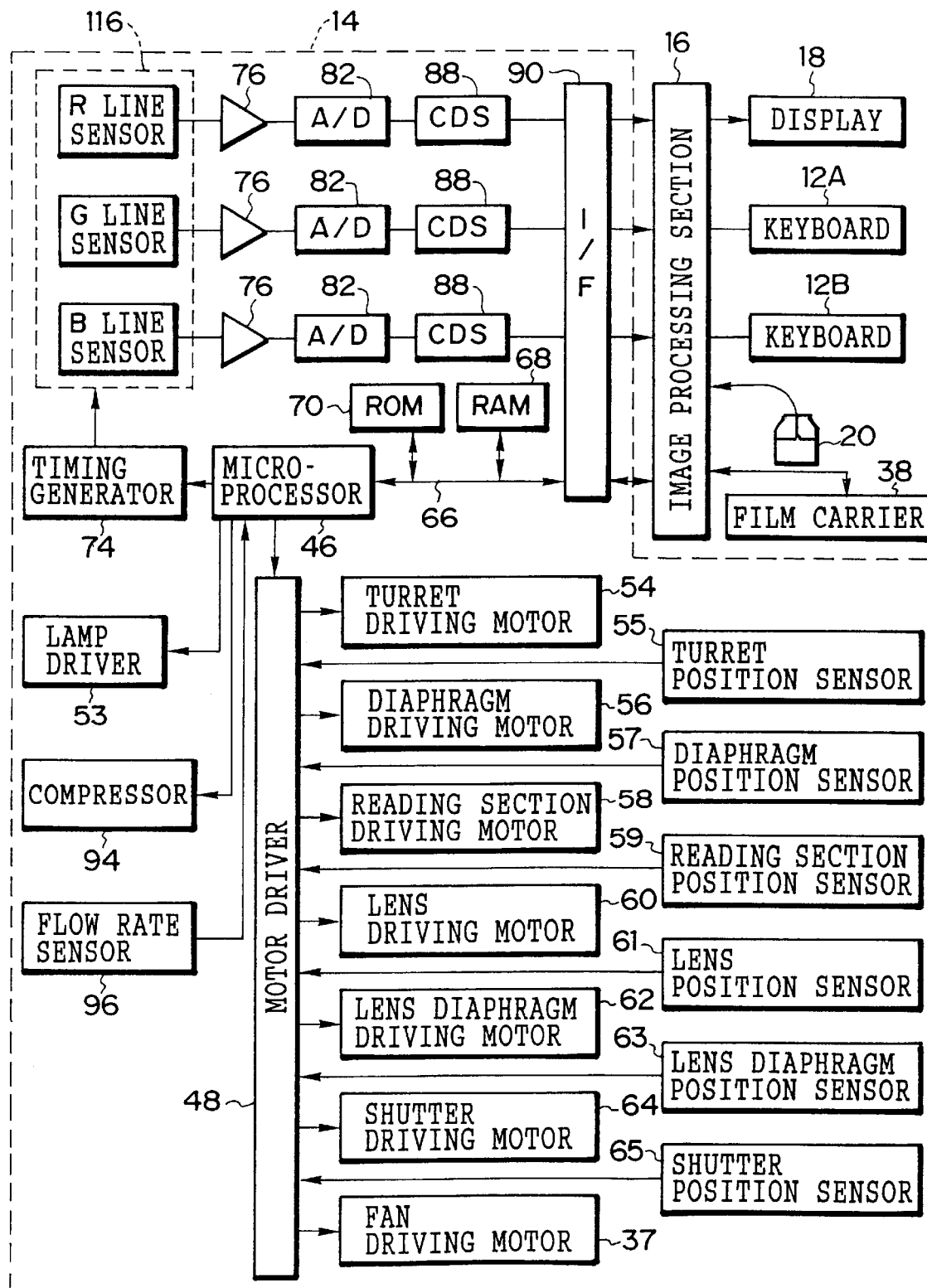
FIG. 7 is a block diagram showing a schematic structure of the electrical system of a line CCD scanner of the image reading apparatus of the embodiment.

Next, the schematic structure of the electric system of the line CCD scanner 14 and the image processing section 16 will be described using FIG. 7, with reference to main sections of the optical system of the line CCD scanner 14 shown in FIG. 6.

The line CCD scanner 14 has a microprocessor 46 as the control means of the present invention for controlling the entire system of the line CCD scanner 14. RAM 68 (for example, SRAM) and ROM 70 (for example, ROM whose stored contents can be rewritten) are connected to the microprocessor 46 via a bus 66, and a lamp driver 53, a compressor 94, a flow rate sensor 96, and a motor driver 48 are also connected thereto. The lamp driver 53 turns on/off the lamp 32 in response to instructions from the microprocessor 46. The microprocessor 46 operates the compressor 94 so as to supply cooling air to the photographic film 22 when a film image of the photographic film 22 is read. The flow rate of cooling air is detected by the flow rate sensor 96 so that the microprocessor 46 detects any abnormalities.

Figure 4B:
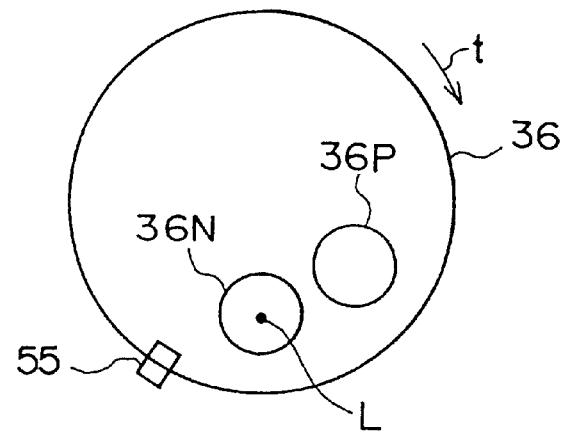
Figure 4D:
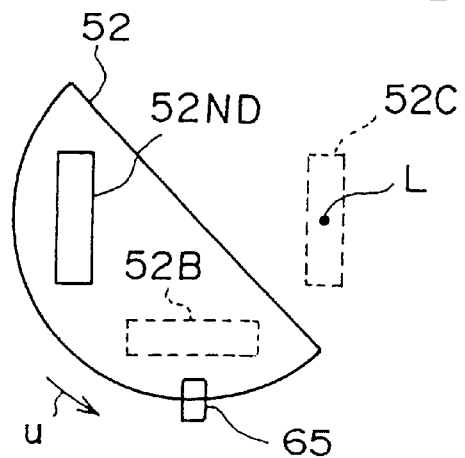

A turret driving motor 54 for driving a turret 36 in the direction of the arrow t in FIG. 4B so as to position any of a balance filter 36N for negative film and balance filter 36P for reversal film of the turret 36 on the optical axis L, and a turret position sensor 55 (see FIG. 4B) for detecting the reference position (not shown) of the turret 36 are connected to the motor driver 48. Further, a driving motor 56 for sliding the diaphragm 39, a diaphragm position sensor 57 for detecting the position of the diaphragm 39, a reading section driving motor 58 for sliding a mounting base 47 (that is, line CCD 116 and lens unit 50) along a guide rail 42, a reading section position sensor 59 for detecting the position of the mounting base 47, a lens driving motor 60 for sliding the lens unit 50 along the supporting rail 49, a lens position sensor 61 for detecting the position of a lens unit 50, a lens diaphragm driving motor 62 for rotating the diaphragm plate 51A of the lens diaphragm 51, a lens diaphragm position sensor 63 for detecting the position (position of the diaphragm 51A) of the lens diaphragm 51, a shutter driving motor 64 for changing the CCD shutter 52 to any of a fully closed state, a fully open state, or a reduced light state, a shutter position sensor 65 for detecting the position of the shutter, and a fan driving motor 37 for driving the fan 34 are connected to the motor driver 48.

When pre-scanning (preliminary reading) or fine scanning (main reading) is carried out by the line CCD 116, the microprocessor 46 rotates and drives the turret 36 by means of the turret driving motor 54 based on the positions of the turret 36 and diaphragm 39 detected by the turret position sensor 55 and diaphragm sensor 57, and the diaphragm 39 is slid by the diaphragm driving motor 56 so as to adjust the light irradiated to the film image.

The microprocessor 46 determines a zoom magnification depending on the film image size and whether or not trimming is to be carried out and slides the mounting base 47 by means of the reading section driving motor 58 based on the position of the mounting base 47 detected by the reading section position sensor 59, so that the film image is read by the line CCD 116 at the determined zoom magnification. Further, the microprocessor 46 slides the lens unit 50 by means of the lens driving motor 60 based on the position of the lens unit 50 detected by the lens position sensor 61.

When auto focus control is carried out so as to match the light receiving surface of the line CCD 116 with a film image focusing position by means of the lens unit 50, the microprocessor 46 slides only the mounting base 47 by means of the reading section driving motor 58. Although this auto focus control can be carried out by maximizing the contrast of a film image to be read by the line CCD 116 (so-called image contrast method), it is also permissible to instead provide a distance sensor for measuring the distance between the photographic film 22 and lens unit 50 (or line CCD 116) by infrared ray or the like and carry out this control based on the distance detected by the distance sensor instead of the film image data.

On the other hand, a timing generator 74 is connected to the line CCD 116. The timing generator 74 generates various types of timing signals (clock signals) for actuating the line CCD 116, the A/D converter 82 which will be described, and the like. A signal output terminal of the line CCD 116 is connected to the A/D converter 82 via an amplifier 76 and a signal outputted from the line CCD 116 is amplified by the amplifier 76 and converted to digital data by the A/D converter 82.

An output terminal of the A/D converter 82 is connected to the image processing section 16 via a correlative dual sampling circuit (CDS) 88 and an interface (I/F) circuit 90 in succession. The CDS 88 samples feed through data indicating the level of feed through signal and pixel data indicating the level of pixel signal and subtracts the feed through data from the pixel data for each pixel. The results of the computations by the CCS 88 (pixel data accurately corresponding to the accumulated electric charge amount in each CCD cell) are outputted to the image processing section 16 in sequence as scan image data via the I/F circuit 90.

Because photometric signals of red, green and blue are outputted in parallel from the line CCD 116, three signal processing systems comprising the amplifier 76, A/D converter 82, and CDS 88 are provided and image data of red, green and blue is inputted in parallel to the image processing section 16 as scan image data from the I/F circuit 90.

Further, the aforementioned display 18, keyboards 12A and 12B, mouse 20 and film carrier 38 are connected to the image processing section 16.

The image processing section 16 carries out darkness correction and brightness correction on red, green, and blue image data inputted in parallel from the line CCD scanner 14.

The darkness correction is carried out to cancel dark current which is flowing in the line CCD 116 in a state where no light is irradiated onto the incident light side of the line CCD 116. In this correction, data inputted from the line CCD scanner 14 (data indicating dark output level of each cell in the sensing section of the line CCD 116) is stored for each cell in a state where the side of the line CCD 116 onto which light is irradiated is shaded by the CCD shutter 52 and then the darkness output level of a cell corresponding to each pixel is subtracted from image data inputted from the line CCD scanner 14 by reading the photographic film 22 by means of the line CCD 116.

In brightness correction, the unevenness in the photoelectric conversion characteristic of the line CCD 116 for each cell is corrected. The gain (brightness correction data) for each cell is determined on the basis of the image data of the film image for adjustment (disparities in the of each pixel represented by the image date are caused by disparities in the photoelectric conversion characteristics for each cell) which has been input from the line CCD scanner 14 by reading the film image for adjustment at the line CCD116, with either a film image for adjustment having a uniform density over the entire surface thereof set in the line CCD scanner 14, or else with no original at all set in the line CCD scanner 14. The image data of the film image which is to be read inputted from the line CCD scanner 14 is corrected in each pixel depending on gain determined for each cell.

The image processing section 16 carries out various image processings such as tone conversion, color transformation, hyper—tone processing for compressing the tone of the extremely low frequency luminance component of an image, hyper—sharpness processing for stressing sharpness while suppressing granulation.

Meanwhile, the photographic film 22 corresponds to the object to be read of the present invention, the lamp 32 to the light source thereof, the diaphragm 39 to the light amount control means thereof, the lens unit 50 to the focusing means thereof, the lens diaphragm 51 to the diaphragm thereof, and the line CCD 116 to the image sensor thereof.

A processing for reading an image (hereinafter referred to as image reading processing) from the photographic film 22 (a negative film in the present invention) to be executed by the microprocessor 46 in the line CCD scanner 14 as an operation of the present embodiment will now be described with reference to the flow chart of FIG. 8. For the line CCD scanner 14, "pre-scan mode" and "fine scan mode" are determined in advance as the modes for reading the photographic film and the state of each section of the line CCD scanner 14 in each mode is also determined in advance.

Figure 8:
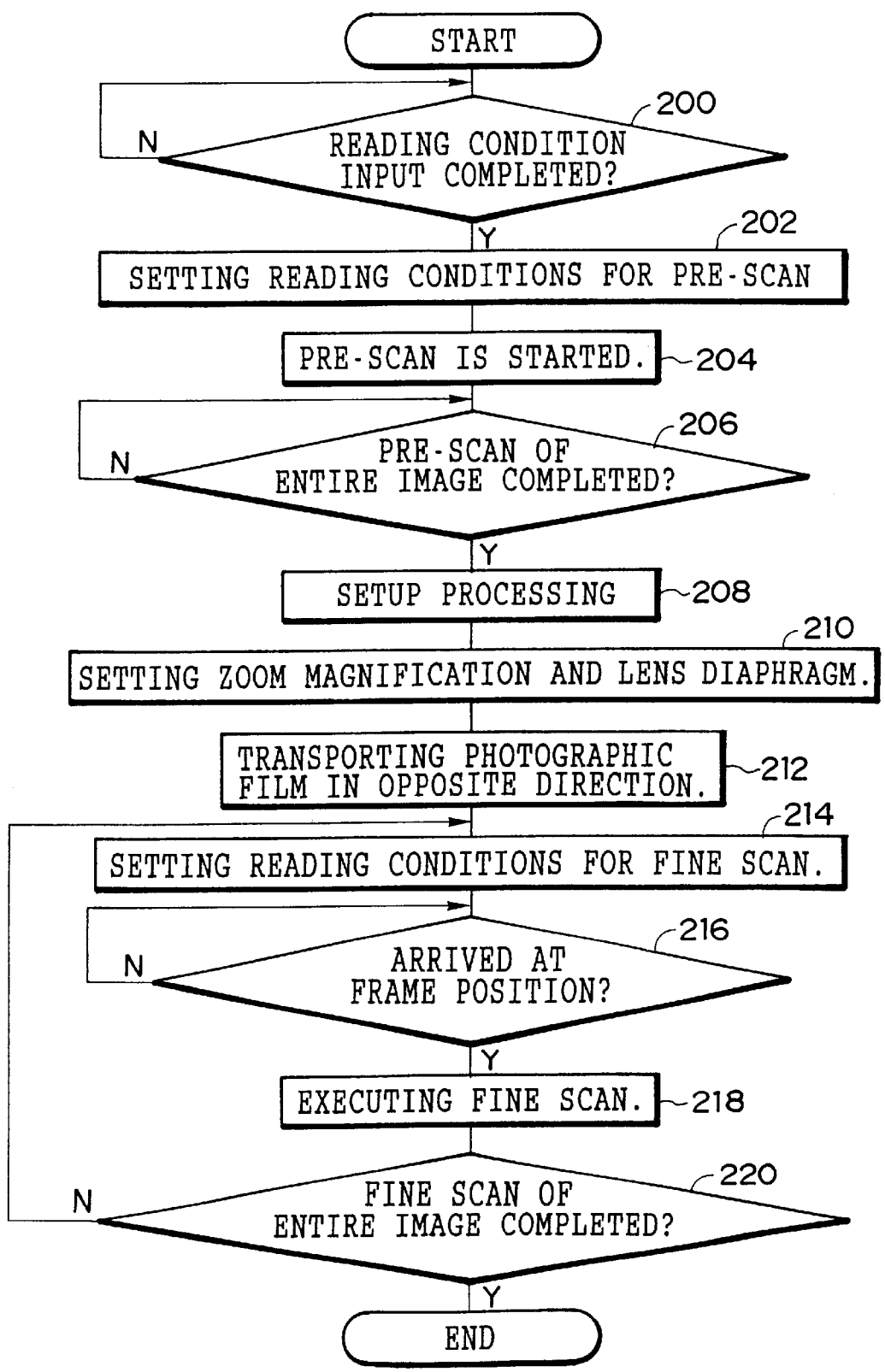
FIG. 8 is a flow chart showing an image reading processing to be executed by a microprocessor of the line CCD scanner according to the first embodiment.

In step 200 of FIG. 8 the input of the reading determining condition for fine scan for the photographic film to be read is awaited. The above-mentioned reading determining condition of the present embodiment is the resolution of the image data. An operator inputs a large value as the resolution if he wants to obtain high precision image data, and if high precision image data is not necessary, he inputs a small value as the resolution.

If the operator inputs a resolution of image data (if step 200 is affirmed), the routine moves to "pre-scan mode" in the next step 202, so that the operation of each section is controlled according to the condition for each section determined as the pre-scan mode" so that the pre-scan for the photographic film 22 is carried out under predetermined reading conditions.

Namely, the lamp 32 is turned on by the lamp driver 53 and the diaphragm 39 is moved to pre-scan mode the position by the diaphragm driving motor 56. The turret 36 is rotated to a negative film position (where the balance filter 36N for a negative film is positioned on the optical axis L) by the turret driving motor 54. The mounting base 47 and lens unit 50 are slid by the reading section driving motor 58 and lens driving motor 60 so that the zoom magnification by the lens unit 50 is 1.0. The lens diaphragm 51 is moved to the fully open position by the driving motor 62 and the CCD shutter 52 is moved to the fully open position by the shutter driving motor 64. Further, a value as the shortest value t of the operation time (reading cycle (electric charge accumulation time) per line unit by the line CCD 116) of the electronic shutter of the line CCD 116 is set for the timing generator 74, and 5×v as the fastest value for the transportation speed of the photographic film 22 is set for the film carrier 38. Thus, the pre-scan for the photographic film 22 is carried out at a relatively low resolution and high speed and the processing is completed in a short time.

Note that the moving of the lens diaphragm 51 to the fully open position during the prescan is to compensate for the short charge accumulation time due to the high speed of the image reading during prescan.

In the next step 204, the pre-scan is started. That is, transportation of the photographic film 22 in a predetermined direction (the direction of the arrow C in FIG. 2) is instructed to the film carrier 38. The photographic film 22 carried at the fastest transportation speed (5×V) is read at the shortest reading cycle by the line CCD 116. Signals outputted from the line CCD 116 are A/D converted in sequence and the converted data is outputted to the image processing section 16 in sequence.

In the next step 206, whether or not the pre-scan has been performed right up to the tailing end of the photographic film 22 is determined and a waiting state is maintained until this determination is affirmative.

During this pre-scan, in the image processing section 16, image data to be inputted from the line CCD scanner 14 is stored in a storage section (RAM, etc.) in sequence and when a predetermined amount of image data is stored, the edge positions of both ends (upstream and downstream in the transportation direction of the photographic film 22) of a film image recorded on the photographic film 22 are determined based on the stored image data.

As proposed in for example, JP-A No. 8-304932, JP-A No. 8-304933, JP-A No. 8-304934, and JP-A No. 8-304935, the determination of the edge positions can be carried out by computing changes in the density of each pixel running in the longitudinal direction of the film, based on the density of each pixel indicated by the pre-scan data, and then adding the values of the changes in the density of each pixel in the longitudinal direction of the film in units of one line in the widthwise direction of the film and comparing the added values of each line. If the photographic film 22 is APS film, it is possible to reduce the time required for determining the edge position by setting a region from the position in which perforations are provided up to a possible edge position as the search area and searching for the edge in the search area.

The image processing section 16 determines the position of the film image frame corresponding to the positions of the perforations based on the edge position determined in the above-described manner. The image processing section 16 then stores the determined frame position in the above-described unillustrated storage section, and on the basis of this frame position, cuts out the image data of the region on which the film image is recorded from the image data stored up top that point, and stores this in the unillustrated storage section.

If the pre-scan up to an end of the photographic film 22 is terminated (if the determination in step 206 in FIG. 8 is affirmative), in step 208, the predetermined image characteristic amounts of the film image are computed from the pre-scan image data stored in the above-mentioned storage section (not shown) by the image processing section 16 during the pre-scanning. The predetermined image characteristic amounts include the color balance value (specifically, the ratio of the minimum density value of each component color of the film image) of the film image.

In step 208, the type of film image (i.e. the size, density type) and the processing conditions for the image processing of the fine scan image data are set on the basis of the computed image characteristic amounts.

If the photographic film 22 to be read is a 135 size film, the setup of the photographic film can be determined on the basis of whether or not the density and tone of a predetermined portion, which is within the image recording range in the case of a standard size film image or out of the image recording range in the case of a non-standard size film image such as a panorama size film image, are equal to the density and tone of a non-exposed section (void in the case of a negative film).

Further, as disclosed in JP-A No. 8-304932, JP-A No. 8-304933, JP-A No. 8-304934 and JP-A No. 8-304935, it is permissible to compute changes in the density of each pixel running in the widthwise direction of the film based on the density of each pixel indicated by the image data at the time of pre-scanning, add the values of the changes in the density of each pixel in the film widthwise direction in units of one line in the longitudinal direction of the film, and then determine the size (aspect ratio) of the film image by comparing the added values of each line. It is also permissible to binarize an image by determining threshold values from a density histogram and determine the setup based on the ratio of binarized image existing in each region of the image. It is also permissible to determine based on the average value and the dispersion of the values of the density change in the aforementioned predetermined portion, or by combining the above methods.

If the photographic film 22 to be read is an APS film, the film image size (print size in this case) can be determined by reading the print size recorded magnetically as data in the APS film magnetic layer.

It is possible to classify the type of density of the film image as one of, e.g. low density, normal density, high density, extremely high density, by comparing the average density, the maximum density, and the minimum density of the film imager with predetermined values. As the processing conditions for image processing, for example, the enlargement ratio/reduction ratio of the image, image processing conditions for hyper-tone, hyper-sharpness, and the like (specifically, the degree of tone compression of the extremely low frequency luminance component of an image, and gain (stress degree) in the high frequency or medium frequency components of an image), tone conversion conditions and the like are computed.

In step 208, zoom magnification corresponding to the resolution and the state of the lens diaphragm 51 of the lens unit 50 are determined based on the resolution of the image data inputted by an operator in the above step 200.

For example, if the resolution of the image data inputted by the operator is relatively high, it is necessary to set the zoom magnification relatively high to obtain image data of a required number of pixels. However, because the depth of field becomes shallow if the zoom magnification is increased so that the picture quality deteriorates, the lens diaphragm 51 of the lens unit 50 is narrowed (narrowing a substantially star-shaped area (hereinafter called aperture area) of FIG. 4C).

On the other hand, if the resolution of the image data inputted by the operator is relatively low, the zoom magnification may be set relatively low in order to obtain image data of a smaller number of pixels corresponding to the resolution. In this case, because the depth of field is deepened, the lens diaphragm 51 of the lens unit 50 is opened in accordance with the zoom magnification (so that the aperture area is increased). Note that the zoom magnification corresponds to the focusing magnification of the present invention.

The relation between the resolution of the image data, zoom magnification, and the state of the lens diaphragm is expressed as follows. The zoom magnification and the lens diaphragm 51 are set in such a manner that, as the resolution of the data increases, the zoom magnification increase and the lens diaphragm 51 is narrowed.

If the image type and image processing conditions are set for all frame images, and both the zoom magnifications according to the resolution of the image data and the condition of the lens diaphragm 51 are determined, then in the next step 210, the mounting base 47 is slid by the reading section driving motor 58 based on the position of the mounting base 47 detected by the reading section position sensor 59 so that the film image is read by the line CCD 116 at a determined magnification and the lens unit 50 is slid by the lens driving moter 60 based on a position of lens unit 50 detected by the lens position sensor 61. At the same time, the diaphragm plate 51A is rotated by the lens diaphragm driving motor 62 so as to obtain a determined state of the lens diaphragm 51 or so that the aperture area of the lens diaphragm 51 is narrower as the zoom magnification is higher.

In the next step 212, the film carrier 38 is instructed to transport the photographic film 22 in a direction opposite to the above predetermined direction (the opposite direction to the direction of arrow C in FIG. 2) in order to fine scan the film image.

In the next step 214, the operation of each section of the line CCD scanner 14 is controlled so as to carry out fine scanning of the above film image under a reading condition suitable for the type of a film image being fine scanned.

First, the type of film image to be fine scanned (in this case, a film image which first reaches the reading position by transporting the photographic film 22 in a direction opposite to a predetermined direction) is fetched and determined, so that a fine scan mode suitable for that type is set. For example, if the type is "high density frame", operations of respective sections are controlled according to the conditions of the respective sections predetermined as being fine scan mode conditions for a high density frame.

Namely, the lamp 32 is turned on, the diaphragm 39 is moved to the fine scanning position for a high density frame, the turret 36 is rotated to the negative film position and the CCD shutter 52 is moved to the full open position. The operation time t (reading frequency) of the electronic shutter of the line CCD 116 is set for the timing generator 74 and a transportation speed v for the photographic film 22 is set for the film carrier 38. The high density film image allows a small amount of light to pass through and to read the high density film image accurately at a high dynamic range, the diaphragm 39 at the time of fine scanning a high density frame is positioned nearly fully open.

In the next step 216, whether or not the edge of a film image to be fine scanned has reached the reading position (optical axis position) of the line CCD 116 is determined based on a frame position stored in the storage section (not shown) of the image processing section 16 at the time of pre-scan and a waiting state is maintained until the determination is affirmative. If the determination is affirmative in step 216, the routine proceeds to step 218, in which a film image arriving at the reading position is read by the line CCD 116. Signals outputted from the line CCD 116 are A/D converted in sequence and a fine scan which is outputted in sequence as fine scan image data to the image processing section 16 is carried out. As a result, the film image is fine scanned under optimum reading conditions for that type of film image.

The fine scan image data outputted from the line CCD scanner 14 to the image processing section 16 is subjected to image processing by the image processing section 16 under computed and stored processing conditions, and the processed data is then outputted to a laser printer section (not shown) or externally outputted as an image file.

When the fine scan of a single film image is completed, the routine proceeds to step 220, in which it is determined whether or not fine scanning of all the film images recorded on the photographic film 22 to be read has been completed. If the determination is negative, the routine returns to step 214, and steps 214–220 are repeated. In steps 214–220, a fine scan of each film image is carried out under optimum reading conditions for the type of film image recorded on the photographic film to be read. If the determination of step 220 is affirmative, the image reading processing is completed.

As described above in detail, in the image reading apparatus of the first embodiment, the lens unit 50 is provided with a lens diaphragm 51 capable of adjusting the luminous flux width of light passing there through and the condition of the lens diaphragm 51 is adjusted in accordance with a specified resolution. As a result, it is possible to obtain an optimum luminous flux width in accordance the specified resolution so that high quality image data can be obtained.

As described above, according to the first embodiment, the resolution of the image data is inputted as the reading condition in step 200 of FIG. 8 and the zoom magnification is changed depending on the inputted resolution. The lens diaphragm 51 is then adjusted in accordance with the zoom magnification. However, the present invention is not limited to this example, and it is also permissible to input the (effective) F number of the original object to be read as a reading condition and adjust the lens diaphragm 51 in accordance with the zoom magnification so that the effective F number is substantially constant.

The effective F number of the object to be read is expressed by the following formula (1) based on the F number (value proportional to an inverse number of a diameter of an optical system incident iris and the brighter, the smaller) used for a criterion for indicating brightness of the optical system. This is equivalent to the emission angle of light passing through the photographic film 22 after the light has entered into the incident iris of the optical system 120.

$$\text{Effective } F \text{ number} = (1 + 1/m) \times F \text{ number} \quad (1)$$

where m indicates zoom magnification.

Figure 9:
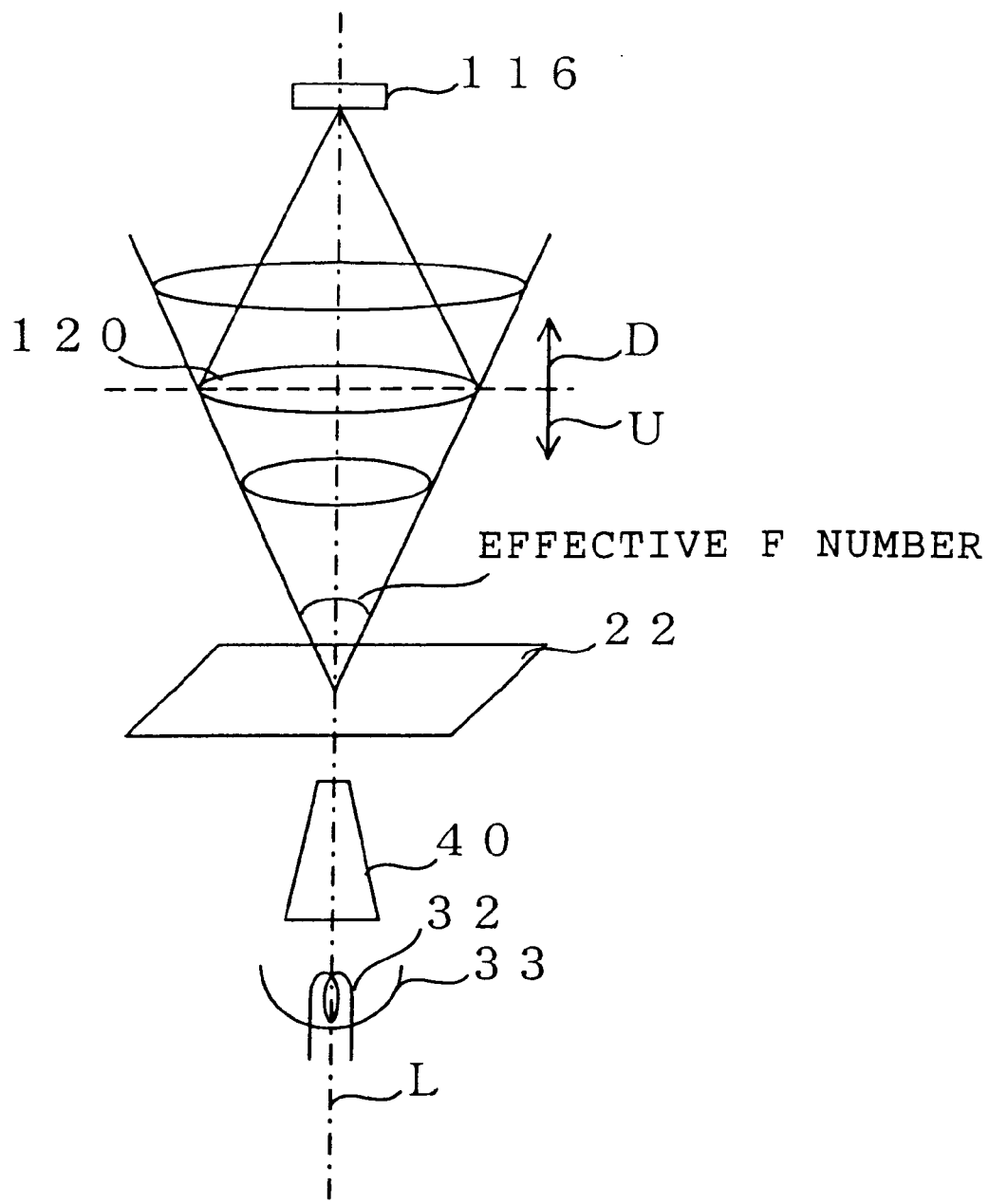
FIG. 9 is a schematic view showing a effective F number and the condition of an opening area of the lens diaphragm in case where the effective F number is substantially constant.

Therefore, for example, if the zoom magnification is increased or if the optical system 120 is moved in the direction of the arrow U of FIG. 9, the incident iris of the optical system is narrowed in order to make the effective F number of the original object to be read substantially constant. Namely, according to the present embodiment, the opening area of the lens diaphragm 51 of the lens unit 50 corresponding to the above optical system is narrowed.

On the other hand, to make the effective F number of the reading object number substantially constant if the zoom magnification is lowered or if the optical system 120 is moved in the direction of arrow D of FIG. 9, the incident iris of the optical system is enlarged. Namely, according to the present embodiment, the aperture area of the lens diaphragm 51 of the lens unit 50 corresponding to the above optical system is enlarged.

As described above, the condition of the lens diaphragm 51 is controlled so that the effective F number of the original object to be read is constant. As a result, it is possible to control the lens diaphragm so that if the zoom magnification is increased, the aperture area of the lens diaphragm 51 is narrowed and if the zoom magnification is decreased, the aperture area of the lens diaphragm 51 is enlarged.

Second Embodiment

Figure 10:
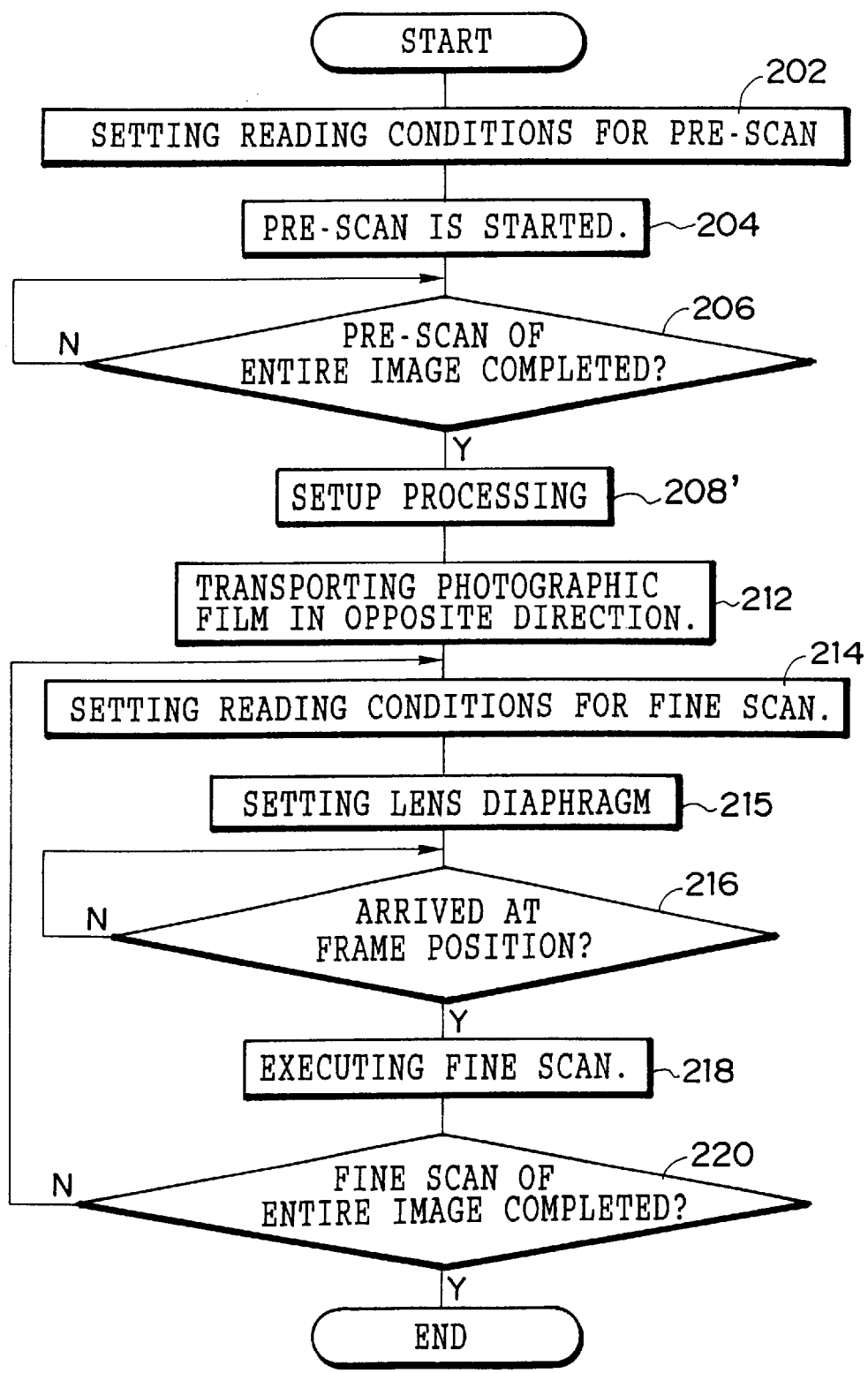
FIG. 10 is a flow chart of the image reading processing to be executed by the microprocessor of the line CCD scanner according to the second embodiment.

Although in the first embodiment a case was described in which the condition of the lens diaphragm 51 of the lens unit 50 is adjusted according to reading conditions inputted by an operator, a case in which the lens diaphragm 51 is automatically adjusted based on reading conditions obtained by pre-scanning will be described in the second embodiment. Because the structure of the image reading apparatus of the second embodiment is the same as in the first embodiment, a description thereof is omitted and the operation of the second embodiment will be described with reference to FIG. 10. FIG. 10 is a flow chart showing the image reading processing to be executed by the microprocessor 46 in the line CCD scanner 14 according to the second embodiment. The same reference numerals are used for the same components as in the flow chart of FIG. 8 and the descriptions thereof are simplified.

In steps 202–206 of FIG. 10, the photographic film 22 is pre-scanned as in the above first embodiment. During this pre-scanning, the processing to be executed in the image processing section 16 (storage of pre-scan image data, determination of the edge position of the film image, and storage of the frame position based on the edge position) is carried out as in the above first embodiment.

Although in step 208', substantially the same processing as in step 208 of the first embodiment is carried out, this step is different from step 208 only in that the processings for determining the zoom magnification and the condition of the lens diaphragm 51, which are executed in step 208, are not carried out. In the next steps 212 and 214, transportation of the photographic film 22 in the opposite direction is started and reading conditions for the fine scan are set as in the first embodiment.

In the next step 215, the condition of the lens diaphragm 51 of the lens unit 50 is set in accordance with the type of film image to be subjected to fine scan.

Namely, according to the present embodiment, the condition of the lens diaphragm 51 is controlled so that the aperture area of the lens diaphragm 51 is enlarged as the density of the film image is increased. For example, the condition of the lens diaphragm 51 is so controlled that if the type of film image to be subjected to fine scan is "ultra high density frame", the aperture area of the lens diaphragm 51 is maximized and if the type of film image is "low density frame", the aperture area of the lens diaphragm 51 is adjusted to midway between the maximum and minimum.

The, processings of steps 216–220 are then carried out as in the above first embodiment.

As described above, in the image reading apparatus of the second embodiment, the lens unit 50 is provided with a lens diaphragm 51 capable of adjusting the luminous flux width of light passing there through and the condition of the lens diaphragm 51 is adjusted in accordance with the density of the film image. Therefore, it is possible to obtain an optimum luminous flux width in accordance with the density of the film image so that high quality image data can be obtained.

Further, because in the image reading apparatus of the second embodiment, the aperture area of the lens diaphragm 51 is automatically adjusted in accordance with the density (type) of the film image obtained by pre-scan, it is possible to effectively set an optimum condition of the lens diaphragm 51 in accordance with the density of the film image.

Although a case in which the condition of the lens diaphragm 51 of the lens unit 50 is controlled in accordance with the density of the film image has been described in the second embodiment, the present invention is not limited to this example, and it is permissible to control the condition of the lens diaphragm 51 based on various parameters such as those shown in Table 1.

TABLE 1

| Parameter | Condition | Lens diaphragm condition (Aperture area) |
|---|---|---|
| Zoom magnification | low | wide |
|  | high | narrow |
| Reading speed | slow | narrow |
|  | fast | wide |
| Degree of unevenness of surface of original | small | wide |
|  | large | narrow |
| Degree of diffusion of original | small | narrow |
|  | large | wide |
| Reading size of original | small | wide |
|  | large | narrow |
| Holding original is in a mounted state | yes | narrow |
|  | no | wide |

Namely, if the lens diaphragm is controlled according to the parameters shown in Table 1, the aperture area of the lens diaphragm 51 is narrowed as the zoom magnification is increased, the aperture area of the lens diaphragm 51 is enlarged as the reading speed is increased, and the aperture area of the lens diaphragm 51 is narrowed as the degree of the unevenness of the surface of the original (photographic film) is increased. Further, the aperture area of the lens diaphragm 51 is enlarged as the degree of diffusion of the original is higher, the aperture area of the lens diaphragm 51 is narrowed as the reading size of the original is increased, and the aperture area of the lens diaphragm is narrowed when the original is held in a mounted state. By reducing the aperture area, the luminous flux width of light striking the lens unit 50 is decreased and by enlarging the aperture area, the luminous flux width of light striking the lens unit 50 is increased.

The degree of unevenness of the surface of the above original corresponds to the degree of fluttering of the surface of the photographic film 22. For example, if the photographic film is of an elongated type, the front end or rear end of the photographic film 22 in the transportation direction sometimes cannot be nipped by a transportation roller (not shown) for the photographic film 22 in the film carrier 38. In this case, it is considered that the film image nearest the leading or rear edge of the film has a large unevenness and therefore, the aperture area of the lens diaphragm 51 is narrowed as compared to when the other film images are read.

When the photographic film to be read is a monochrome film, silver is contained in the film and this silver diffuses the light passing through the film. Therefore, in this case (i.e. when the photographic film is a monochrome film), it is considered that the degree of diffusion of the photographic film is large, and the aperture area of the lens diaphragm 51 is enlarged. Whether or not the photographic film is monochrome can be determined based on the DX code or the like recorded on the photographic film.

Further, as the reading size of the original is increased, the influence of vignetting, in which a portion of the light incident on the lens unit 50 is shaded by a lens hood of the lens unit 50, is intensified. Therefore, by narrowing the aperture area of the lens unit 50 as the reading size of the original is increased, it is possible to suppress the influence of such vignetting caused by the size of the reading size of the original.

Further, when the photographic film is a film nipped by a mounting member, the aperture area of the lens diaphragm 51 is narrowed and the field of vision deepened, thereby enabling the effects of variations in the thickness of the mounting member to be suppressed.

Further, it is permissible to control the condition of the lens diaphragm 51 by combining a plurality of the parameters shown in Table 1. In this case, it is possible to apply a method in which by storing conditions of the lens diaphragm 51 corresponding to each of a plurality of parameters in the form of a table, the condition of the lens diaphragm 51 is controlled by referring to the table.

Moreover, in each of the above embodiments, an explanation was given for the case when the diaphragm 39 was used with the aim of setting the amount of light irradiated onto the photographic film in accordance with density of the photographic film 39, however, the present invention is not limited to this and the diaphragm 39 may also be used in order to correct the amount of light reaching the line CCD surface after the optimum luminous flux width has been set by the diaphragm 51 in accordance with the reading determining conditions. Namely, for example, when the resolution of image data input by an operator is comparatively high, the zoom magnification is increased and the lens diaphragm 51 is narrowed. In this case, the effective F number of the image expressed by formula (2) below is increased and the amount of light reaching the line CCD surface is reduced.

$$\text{Effective } F \text{ number of image} = (1+m) \times F \text{ number} \quad (2)$$

Accordingly, by positioning the light source diaphragm 39 correspondingly to changes in the effective F number of the image, the amount of light reaching the line CCD surface can be maintained and high quality image data obtained irrespective of the reading determining conditions.

Although in each of the above embodiments, a case in which the amount of light irradiated on the photographic film 22 is adjusted by the diaphragm 39 has been described, the present invention is not limited to this example, and it is permissible to adjust the amount of light by increasing or decreasing the driving voltage of the lamp 32. In this case, the diaphragm 39 may be eliminated so that cost of the entire apparatus can be reduced.

Although in each of the above embodiments, a case in which a photographic film which is a transparent material is used as the original to be read for the present invention has been described, the present invention is not limited to this example, and it may be constructed with a reflective original photograph used therein.

Further, although in each of the above embodiments, a case in which a line CCD is applied as an image sensor has been described, the present invention is not limited to this example, and it may be constructed with an area CCD used therein.

Figure 11:
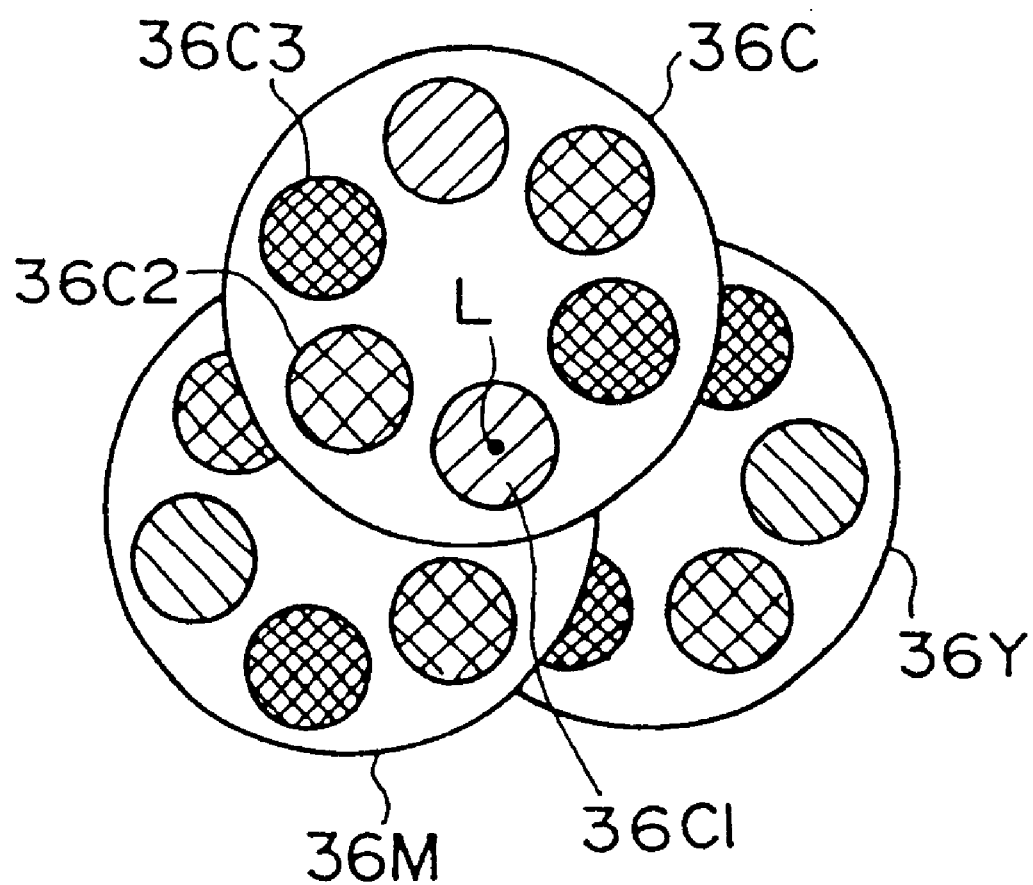
FIG. 11 is a plan view showing a modified embodiment of a turret.

Further, the present invention is not limited to the above described turret (see FIG. 4B). As shown in FIG. 11, the turret may be composed of a turret 36C for a cyan filter for absorbing red light, a turret 36M for a magenta filter for absorbing green light, and a turret 36Y for a yellow filter for absorbing bluish purple ray. A plurality of cyan filters 36C1, 36C2, 36C3 having different densities are inserted in the turret 36C. The density increases in the order of the cyan filters 36C1, 36C2 and 36C3. The other turrets 36M and 36Y have the same structure. The turrets 36C, 36M, 36Y are rotatably supported so that each filter selected in each turret overlaps others on the optical axis L.

Because, in the image reading apparatus of the first aspect of the present invention, the focusing means contains a diaphragm capable of changing the luminous flux width of the projected light and the condition of the diaphragm is controlled so that the luminous flux width is adjusted depending on the reading determining conditions of the object to be read, there is an effect that the luminous flux width of light passing through the focusing means can be controlled to the optimum optical width in accordance with the reading determining conditions, so that high quality image data can be obtained.

Further, in the image reading apparatus of the second aspect of the present invention, because one of the reading determining conditions according to the first aspect is the focusing magnification of the focusing means and the condition of the diaphragm is controlled so that the higher the focusing magnification, the smaller the luminous flux width, there is an effect that the optimum luminous flux width can be obtained in accordance with the focusing magnification so that high quality image data can be obtained.

Further, in the image reading apparatus of the third aspect of the present invention, because one of the reading determining conditions according to the first aspect is the effective F number of the object to be read and the condition of the diaphragm is controlled so that the effective F number is constant, as a result, there is an effect that the optimum luminous flux width in accordance with the focusing magnification of the focusing means can be obtained so that high quality image data can be obtained.

Further, in the fourth aspect of the present invention, because one of the reading determining conditions according to the first aspect is the density of the object to be read and the condition of the diaphragm is controlled so that the higher the density, the larger the luminous flux width, there is an effect that the optimum luminous flux width in accordance with the density of the object to be read can be obtained so that high quality image data can be obtained.

Further, in the image reading apparatus of the fifth aspect of the present invention, because one of the reading determining conditions according to the first aspect is the reading speed for the object to be read and the diaphragm is controlled so that the faster the reading speed, the larger the luminous flux width, there is an effect that the optimum luminous flux width in accordance with the reading speed for the object to be read can be obtained, so that high quality image data can be obtained.

Further, in the image reading apparatus of the sixth aspect of the present invention, because one of the reading determining conditions according to the first aspect is the amount of unevenness of the surface of the object to be read and the condition of the diaphragm is controlled so that the larger the amount of unevenness, the smaller the luminous flux width, there is an effect that the optimum luminous flux width in accordance with the amount of unevenness of the object to be read can be obtained, so that high quality image data can be obtained.

Further, in the image reading apparatus of the seventh aspect of the present invention, because one of the reading determining conditions according to the first aspect is the degree of diffusion of the object to be read and the condition of the diaphragm is controlled so that the larger the degree of diffusion, the larger the luminous flux width, there is an effect that the optimum luminous flux width in accordance with the degree of diffusion of the object to be read can be obtained, so that high quality image data can be obtained.

Further, in the image reading apparatus of the eighth aspect of the present invention, because one of the reading determining conditions according to the first aspect is the reading size of the object to be read and the condition of the diaphragm is controlled so that the larger the reading size, the smaller the luminous flux width, there is an effect that the optimum luminous flux width in accordance with the reading size of the object to be read can be obtained, so that high quality image data can be obtained.

Further, in the image reading apparatus of the ninth aspect of the present invention, because one of the reading determining conditions according to the first aspect is the scanning state and the condition of the diaphragm is controlled so that the width of the luminous flux is greater when the scanning state is a prescan scanning state than when the scanning state is a fine scan scanning sate, the optimum luminous flux width in accordance with the reading size of the original object to be read can be set, so that high quality image data can be set, so that high quality image data can be obtained.

Further, in the image reading apparatus of the tenth aspect of the present invention, because one of the reading determining conditions according to the first aspect is the state in which the original object to be read is held, and the condition of the diaphragm is controlled by the control means so that when the original object to be read is held in a mounted state, the width of the luminous flux is reduced.

Further, in the image reading apparatus of the eleventh aspect of the present invention, because the reading determining conditions according to the first aspect include at least two of the focusing magnification for the object to be read, the effective F number of the object to be read, the density, reading speed, amount of unevenness, amount of diffusion, reading size, scanning state, and the state in which the object to be read is held, and the condition of the diaphragm is controlled based on the reading determining conditions, there is an effect that the optimum luminous flux width in accordance with the reading determining conditions including at least two items can be obtained, so that high quality image data can be obtained.

Further, in the image reading apparatus of the twelfth aspect of the present invention, because the first aspect is provided with a light amount control means capable of controlling the amount of light irradiated onto the object to be read, there is an effect that the optimum light amount and luminous flux width in accordance with the reading determining conditions can be obtained, so that high quality image data can be obtained.

What is claimed is:

1. An image reading apparatus comprising:
   a light source for illuminating an original object to be read;
   focussing means provided with a diaphragm capable of altering the width of the luminous flux of a light beam projected through the diaphragm, and for focussing an image recorded on said original document to be read;

an image sensor for separating said image recorded on said original document to be read, reading said image, and outputting said image as image data when a light which has passed through said focussing means is projected onto said image sensor; and control means for controlling the state of said diaphragm for adjusting the width of said luminous flux in accordance with the reading determining conditions of said original object to be read, wherein one of said reading determining conditions is a focusing magnification of said focusing means and said control means controls the state of said diaphragm so that the higher said focusing magnification, the smaller the width of said luminous flux.

2. An image reading apparatus according to claim 1, wherein one of said reading determining conditions is the density of said original object to be read and said control means controls the state of said diaphragm so that the higher said density, the larger the width of said luminous flux.

3. An image reading apparatus according to claim 1, wherein one of said reading determining conditions is the reading speed for said original object to be read and said control means controls the state of said diaphragm so that the faster said reading speed, the larger the width of said luminous flux.

4. An image reading apparatus according to claim 1, wherein one of said reading determining conditions is the amount of unevenness on the surface of said original object to be read and said control means controls the state of said diaphragm so that the larger the amount of said unevenness, the smaller the width of said luminous flux.

5. An image reading apparatus according to claim 1, wherein one of said reading determining conditions is the degree of diffusion of said original object to be read and said control means controls the state of said diaphragm so that the larger said degree of diffusion becomes, the larger the width of said luminous flux.

6. An image reading apparatus according to claim 1, wherein one of said reading determining conditions is the scanning state and the condition of the diaphragm is controlled so that the width of the luminous flux is greater when the scanning state is a prescan scanning state than when the scanning state is a fine scan scanning state.

7. An image reading apparatus according to claim 1, wherein one of said reading determining conditions is the state in which the original object to be read is held, and the condition of the diaphragm is controlled by the control means so that when the original object to be read is held in a mounted state, the width of the luminous flux is reduced.

8. An image reading apparatus according to claim 1, wherein said reading determining conditions include two or more of the focussing magnification of said original object to be read, the effective F number of said original object to be read, the density, the reading speed, the amount of unevenness, the degree of diffusion, the reading size, the scanning state, and the state in which said image to be read is held, and wherein said control means controls the condition of said diaphragm on the basis of said two or more reading determining conditions.

9. An image reading apparatus according to claim 1, further comprising a light amount control means capable of controlling the amount of light for illuminating said original object to be read.

10. An image reading apparatus comprising:

a light source for illuminating an original object to be read;

focussing means provided with a diaphragm capable of altering the width of the luminous flux of a light beam projected through the diaphragm, and for focussing an image recorded on said original document to be read;

an image sensor for separating said image recorded on said original document to be read, reading said image, and outputting said image as image data when a light which has passed through said focussing means is projected onto said image sensor; and control means for controlling the state of said diaphragm for adjusting the width of said luminous flux in accordance with the reading determining conditions of said original object to be read, wherein one of said reading determining conditions is the effective F number of said original object to be read and said control means controls the state of said diaphragm so that said effective F number is constant.

11. An image reading apparatus according to claim 10, wherein one of said reading determining conditions is the density of said original object to be read and said control means controls the state of said diaphragm so that the higher said density, the larger the width of said luminous flux.

12. An image reading apparatus according to claim 10, wherein one of said reading determining conditions is the reading speed for said original object to be read and said control means controls the state of said diaphragm so that the faster said reading speed, the larger the width of said luminous flux.

13. An image reading apparatus according to claim 10, wherein one of said reading determining conditions is the amount of unevenness on the surface of said original object to be read and said control means controls the state of said diaphragm so that the larger the amount of said unevenness, the smaller the width of said luminous flux.

14. An image reading apparatus according to claim 10, wherein one of said reading determining conditions is the degree of diffusion of said original object to be read and said control means controls the state of said diaphragm so that the larger said degree of diffusion becomes, the larger the width of said luminous flux.

15. An image reading apparatus according to claim 10, wherein one of said reading determining conditions is the scanning state and the condition of the diaphragm is controlled so that the width of the luminous flux is greater when the scanning state is a prescan scanning state than when the scanning state is a fine scan scanning state.

16. An image reading apparatus according to claim 10, wherein one of said reading determining conditions is the state in which the original object to be read is held, and the condition of the diaphragm is controlled by the control means so that when the original object to be read is held in a mounted state, the width of the luminous flux is reduced.

17. An image reading apparatus according to claim 10, wherein said reading determining conditions include two or more of the focussing magnification of said original object to be read, the effective F number of said original object to be read, the density, the reading speed, the amount of unevenness, the degree of diffusion, the reading size, the scanning state, and the state in which said image to be read is held, and wherein said control means controls the condition of said diaphragm on the basis of said two or more reading determining conditions.

18. An image reading apparatus according to claim 10, further comprising a light amount control means capable of controlling the amount of light for illuminating said original object to be read.

19. An image reading apparatus comprising:

a light source for illuminating an original object to be read;

focussing means provided with a diaphragm capable of altering the width of the luminous flux of a light beam projected through the diaphragm, and for focussing an image recorded on said original document to be read;

an image sensor for separating said image recorded on said original document to be read, reading said image, and outputting said image as image data when a light which has passed through said focussing means is projected onto said image sensor; and control means for controlling the state of said diaphragm for adjusting the width of said luminous flux in accordance with the reading determining conditions of said original object to be read, wherein one of said reading determining conditions is the reading size of said original object material and said control means controls the state of said diaphragm so that the larger said reading size becomes, the smaller the width of said luminous flux.

20. An image reading apparatus according to claim 19, wherein one of said reading determining conditions is the density of said original object to be read and said control means controls the state of said diaphragm so that the higher said density, the larger the width of said luminous flux.

21. An image reading apparatus according to claim 19, wherein one of said reading determining conditions is the reading speed for said original object to be read and said control means controls the state of said diaphragm so that the faster said reading speed, the larger the width of said luminous flux.

22. An image reading apparatus according to claim 19, wherein one of said reading determining conditions is the amount of unevenness on the surface of said original object to be read and said control means controls the state of said diaphragm so that the larger the amount of said unevenness, the smaller the width of said luminous flux.

23. An image reading apparatus according to claim 19, wherein one of said reading determining conditions is the degree of diffusion of said original object to be read and said control means controls the state of said diaphragm so that the larger said degree of diffusion becomes, the larger the width of said luminous flux.

24. An image reading apparatus according to claim 19, wherein one of said reading determining conditions is the scanning state and the condition of the diaphragm is controlled so that the width of the luminous flux is greater when the scanning state is a prescan scanning state than when the scanning state is a fine scan scanning state.

25. An image reading apparatus according to claim 19, wherein one of said reading determining conditions is the state in which the original object to be read is held, and the condition of the diaphragm is controlled by the control means so that when the original object to be read is held in a mounted state, the width of the luminous flux is reduced.

26. An image reading apparatus according to claim 19, wherein said reading determining conditions include two or more of the focussing magnification of said original object to be read, the effective F number of said original object to be read, the density, the reading speed, the amount of unevenness, the degree of diffusion, the reading size, the scanning state, and the state in which said image to be read is held, and wherein said control means controls the condition of said diaphragm on the basis of said two or more reading determining conditions.

27. An image reading apparatus according to claim 19, further comprising a light amount control means capable of controlling the amount of light for illuminating said original object to be read.

* * * * *